United States Patent
Ryley, III et al.

(10) Patent No.: US 10,522,864 B1
(45) Date of Patent: Dec. 31, 2019

(54) AMBIENT REACTANTS FUEL CELLS, METHODS, AND SYSTEMS

(71) Applicant: CBN Nano Technologies Inc., Ottawa (CA)

(72) Inventors: James F. Ryley, III, Downey, CA (US); Robert A. Freitas, Jr., Pilot Hill, CA (US)

(73) Assignee: CBN Nano Technologies inc., Ottawa (CA)

( * ) Notice: Subject to any disclaimer, the term of this patent is extended or adjusted under 35 U.S.C. 154(b) by 0 days.

(21) Appl. No.: 16/447,340

(22) Filed: Jun. 20, 2019

(51) Int. Cl.
| | |
|---|---|
| *H01M 8/22* | (2006.01) |
| *H01M 8/0444* | (2016.01) |
| *H01M 8/04082* | (2016.01) |
| *H01M 8/16* | (2006.01) |

(52) U.S. Cl.
CPC .......... *H01M 8/22* (2013.01); *H01M 8/0444* (2013.01); *H01M 8/04201* (2013.01); *H01M 8/16* (2013.01)

(58) Field of Classification Search
None
See application file for complete search history.

(56) References Cited

U.S. PATENT DOCUMENTS

| | | | |
|---|---|---|---|
| 4,293,399 | A | 10/1981 | Belanger et al. |
| 6,436,257 | B1 | 8/2002 | Babas-Dornea et al. |
| 6,503,648 | B1 | 1/2003 | Wang |
| 6,896,222 | B2 | 5/2005 | Dossas et al. |
| 8,002,957 | B2 | 8/2011 | Grincourt et al. |
| 2006/0272943 | A1 | 12/2006 | Chien et al. |
| 2009/0166197 | A1* | 7/2009 | Grincourt .......... G01N 27/4045 |
| | | | 204/412 |

OTHER PUBLICATIONS

A.J. Slate et al. Renewable and Sustainable Energy Reviews 101 (2019) 60-81 (Year: 2019).*
"TWRI Book 9". (1998) pp. 28-33: U.S. Geological Survey.
"Air Solubility in Water". *Engineering ToolBox*. (2004): Engineering ToolBox. Retrieved Jun. 7, 2019 from URL: https://www.engineeringtoolbox.com/air-solubility-water-d_639.html.
"Types of Fuel Cells". (2014): U.S Department of Energy. Retrieved Jun. 7, 2019 from URL: https://web.archive.org/web/20140805090623/https://www.energy.gov/eere/fuelcells/types-fuel-cells.
"Hyperbaric medicine". (2019): Wikipedia, The Free Encyclopedia. Retrieved Jun. 7, 2019 from URL: https://en.wikipedia.org/wiki/Hyperbaric_medicine#Construction.
"Microbial fuel cell". (2019): Wikipedia, The Free Encyclopedia. Retrieved Jun. 7, 2019 from URL: https://web.archive.org/web/20190211194058/https://en.wikipedia.org/wiki/Microbial_fuel_cell.
Bocan & Sejdic. Adaptive Subcutaneous Power Transfer to Implantable Devices: A State of the Art Review. *Sensors*. (2016) vol. 16, . pp. 1-23.

(Continued)

*Primary Examiner* — Wojciech Haske

(57) ABSTRACT

Devices powered by fuel cells can be operated for extended durations when the fuel cells are adapted to extract the necessary reactants for generating power from the surrounding environment and when the concentration of reactants in that environment is maintained at a sufficient level by interaction between the environment and a reactant-enriched atmosphere.

28 Claims, 7 Drawing Sheets

(56) References Cited

OTHER PUBLICATIONS

Carreau, El Hafny-Rahbi, Matejuk, Grillon, & Kieda. Why is the partial oxygen pressure of human tissues a crucial parameter? Small molecules and hypoxia. *J Cell Mol Med*. (2011), Jan. 22, 2011 ed., vol. 15, pp. 1239-1253.

Cearnaigh, Dumont, Chung, & Zelanay. High-Performance Direct Dimethyl Ether Fuel Cell Operating with an Advanced Activation Process. *228th ECS Meeting*. (2015). Phoenix, AZ, US.

Dougherty Jr. The Use of Hydrogen as an Inert Gas During Diving: Pulmonary Function During Hydrogen-Oxygen Breathing at Pressures Equivalent to 200 Feet of Sea Water (B. o. M. a. Surgury, Trans.). (1974) pp. 1-17.

Freitas. Nanomedicine, vol. I: Basic Capabilities. (1999): Landes Bioscience. pp. 81-82; 152-154.

Ge, Yang, Yang, Yin, & Song. Molecular hydrogen: a preventative and therapeutic medical gas for various diseases. *Oncotarget*. (2017) vol. 8, pp. 102653-102673.

Gardette, Comet, Gortan, & Delauze. Long Term Hydrogen Saturation Dive_ Hydra IX. *Undersea and Hyperbaric Medical Society, Inc. Joint Annual Scientific Meeting with the International Congress for Hyperbaric Medicine and the European Undersea Biomedical Society*. (1990). Amsterdam, NL.

Ho. Glucose Fuel Cells. (2014): Stanford university. Retrieved Jun. 7, 2019 from URL: http://large.stanford.edu/courses/2014/ph240/ho2/.

Hu et al. Proton transport through one-atom-thick crystals. *Nature*. (2014), Dec. 4, 2014 ed., vol. 516, pp. 227-230.

Lan et al. RPM3: a multifunctional microporous MOF with recyclable framework and high H2 binding energy. *Inorg Chem*. (2009), Sep. 3, 2009 ed., vol. 48, pp. 7165-7173.

Moghaddam, Pengwang, Lin, Masel, & Shannon. Millimeter-Scale Fuel Cell With Onboard Fuel and Passive Control System. *Journal of Microelectromechanical Systems*. (2008) vol. 17, pp. 1388-1395.

Nave. Electrolysis of Water and Fuel Cell Operation. (2001). Atlanta, GA, US: Department of Physics & Astronomy, Georgia State university. Retrieved Jun. 8, 2019 from URL: http://hyperphysics.phy-astr.gsu.edu/hbase/thermo/electrol.html.

Oshima, Matsunaga, Kondo, & Morimura. Ultralow-power Sensor Node with Nanowatt Wireless Circuit Technology. *NIT Technical Review*. (2015) vol. 13, pp. 1-6.

Pittman. Oxygen Transport. *Regulation of Tissue Oxygenation*. (2011). San Rafael, CA, US: Morgan & Claypool Life Sciences. Retrieved Jun. 7, 2019 from URL: https://www.ncbi.nlm.nih.gov/books/NBK54103/?report=printable.

Rubin & Mor. Physical Modeling of the Enzymatic Glucose-Fuelled Fuel Cells. *Advances in Chemical Engineering and Science*. (2013) vol. 03, pp. 218-226.

Urone, Hinrichs, Dirks, & Sharma. Work, Energy, and Power in Humans. (2019): OpenStax. Retrieved Jun. 8, 2019 from URL: https://pressbooks.bccampus.ca/collegephysics/chapter/work-energy-and-power-in-humans/.

Vendruscolo, Rossi, Schmidell, & Ninow. Determination of Oxygen Solubility in Liquid Media. *ISRN Chemical Engineering*. (2012) vol. 2012, pp. 1-5.

Ren et al. A high power density miniaturized microbial fuel cell having carbon nanotube anodes. *Journal of Power Sources*. (2015) vol. 273, pp. 823-830.

Slate, Whitehead, Brownson, & Banks. Microbial fuel cells: An overview of current technology. *Renewable and Sustainable Energy Reviews*. (2019) vol. 101, pp. 60-81.

Yang, Ghobadian, Goodrich, Montazami, & Hashemi. Miniaturized biological and electrochemical fuel cells: challenges and applications. *Phys Chem Chem Phys*. (2013), Mar. 19, 2013 ed., vol. 15, pp. 14147-14161.

Yeom et al. Microfabrication and characterization of a silicon-based millimeter scale, PEM fuel cell operating with hydrogen, methanol, or formic acid. *Sensors and Actuators B: Chemical*. (2005) vol. 107, pp. 882-891.

\* cited by examiner

AMBIENT REACTANTS FUEL CELLS, METHODS, AND SYSTEMS

CROSS-REFERENCE TO RELATED APPLICATIONS

Not applicable.

FEDERALLY SPONSORED RESEARCH

Not applicable.

SEQUENCE LISTING OR PROGRAM

Not applicable.

TECHNICAL FIELD

The present application relates to the use of fuel cells to power devices through electrical flow generated by reduction/oxidation reactions of chemical reactants, and particularly to the use of fuel cells for powering small-scale devices.

BACKGROUND

Fuel cells generate electrical energy from chemical reactants by facilitating paired oxidization and reduction reactions, where the oxidization reaction liberates electrons and the reduction reaction binds electrons. The electron donor and electron acceptor are separated (often by an electrolyte, which may be an alkali, molten carbonate, phosphoric acid, proton exchange membrane (PEM), solid oxide, or other materials, and in some cases separation is just by distance), and the fuel cell is arranged such that the electrons from the electron donor must flow through a wire to the electron acceptors. In doing so, they generate an electrical current that can be used to power devices While various chemical reactants can be employed, for purposes of discussion, the reactant which releases electrons in an oxidization reaction is referred to herein as a "fuel", and the reactant which gains the electrons is referred to herein as an "oxidizer" (even though it may not actually include oxygen).

Many fuel cell reactions could be generalized, for example, as:

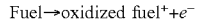

Fuel→oxidized fuel$^+$+$e^-$

Oxidizer+$e^-$→Reduced Oxidizer

One common example of a fuel and oxidizer pair are hydrogen and oxygen gasses; in this example, the reactions are:

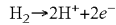

$H_2$→$2H^+$+$2e^-$

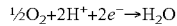

$\frac{1}{2}O_2$+$2H^+$+$2e^-$→$H_2O$

The electrical current results from the fact that the electrons released from the $H_2$ are more energetic (i.e., at a higher potential) than those required to form the $H_2O$.

In a fuel cell, the oxidation reaction occurs at an anode of the fuel cell, and the reduction reaction takes place at a cathode. Electrons flow from the anode to the cathode, and thus through a load placed therebetween, providing direct electrical energy to power the load. The fuel cell is designed to facilitate the oxidation and reduction reactions, typically by employing catalysts. For example, platinum is often used to split H2 into $2H^+$+$2e^-$, although many different catalysts are available, including various metals and alloys (e.g., palladium, iridium, nickel, and combinations thereof), and doped carbon nanotubes (e.g., doped with one of the catalytic metals, and also combinations such as cobalt, nitrogen, and cerium oxide). Catalysts also sometimes incorporate an ionic liquid.

A variety of fuel cells have been proposed and developed, using various fuel and oxidizer reactants, various electrolytes between the anode and cathode, and various approaches to optimize performance for particular situations. Examples fuel cell types include polymer electrolyte membrane (PEM) fuel cells (also referred to as Proton Exchange Membrane fuel cells), direct methanol fuel cells, alkaline fuel cells, phosphoric acid fuel cells, molten carbonate fuel cells, solid oxide fuel cells, reversible fuel cells, microbial fuel cells, and glucose fuel cells. ("Types of Fuel Cells," U.S Department of Energy, 2014); ("Microbial fuel cell," Wikipedia, The Free Encyclopedia, 2019); (Ho, "Glucose Fuel Cells," Stanford university, 2014) Some types of fuel cells operate at very high temperatures (e.g., molten carbonate fuel cells operate at 600 C and above), but some can operate at much lower temperatures (e.g., body temperature, room temperature, or lower).

For powering small devices, it is desirable to employ fuel cells that are simple in structure to facilitate small-scale fabrication. Additionally, when used to power medical or veterinary devices to be employed inside a biological organism, fuel cells should not only be small, but also designed to operate at temperatures typically found in living organisms, and should preferably employ reactants of low toxicity and, at least if they are to be released into the environment, produce waste products of low toxicity (although acceptable toxicity may be relative to the need and/or alternatives; for example, chemotherapy agents used for cancer treatment are quite toxic relative to many other drugs, but when the alternative is death from cancer, this level of toxicity is considered acceptable). Three examples of fuel cells that meet these criteria are hydrogen-oxygen fuel cells, acetylene-oxygen fuel cells, and glucose-oxygen fuel cells. Note that the operation of fuel cells inside living organisms or fuel cells used as part of a device that operates on living organisms (e.g., a cell-based in vitro assay system) is referred to herein as "medical" regardless of the use, or the species of organism.

Hydrogen-oxygen PEM fuel cells are simple and durable in structure, having a proton-conducting polymer membrane positioned between the anode and the cathode. The membrane allows hydrogen ions (protons) to pass through, but blocks passage of electrons. The simple structure facilitates small-scale fabrication, with a functional 1 mm×3 mm×3 mm fuel cell having been fabricated and tested in 2008. (Moghaddam, Pengwang et al., "Millimeter-Scale Fuel Cell With Onboard Fuel and Passive Control System," Journal of Microelectromechanical Systems, 6, 2008) While simple, a limitation of such PEM fuel cells is that they must be fueled by very pure hydrogen sources, and even tiny amounts of certain contaminants can poison the fuel cell (for example, platinum and platinum alloy catalysts are readily poisoned by small amounts of carbon monoxide). The requirement of providing a source of hydrogen either limits the use to applications where a continual supply of hydrogen is available, generally either via connection to an external hydrogen store (which then requires some form of tubing connected to the fuel cell), or an internal hydrogen store (which is then space-limited, and for small devices, this limitation can be severe), although one example has been proposed where the hydrogen is absorbed directly from the gas chamber of an airship using hydrogen as the lifting gas. (U.S. Pat. No. 6,986,222 (Dossas and Kraft, "Hydrogen Lighter-Than-Air Ship," U.S. Pat. No. 6,896,222, 2005)) One advantage of hydrogen-oxygen fuel cells for medical applications is that the waste product, water, is non-toxic and thus can be freely released into the organism.

Acetylene-oxygen fuel cells have been used as detectors for sensing the presence of acetylene in dielectric fluid, as taught in U.S. Pat. Nos. 6,436,257 and 8,002,957, both incorporated herein by reference. (Babas-Dornea and Noirhomme, "Means for Detecting and Measuring the Concentration of Acetylene Dissolved in a Fluid," U.S. Pat. No. 6,436,257, 2002); (Grincourt and Babes-Dornea, "Sensor Apparatus for Measuring and Detecting Acetylene and Hydrogen Dissolved in Fluids," U.S. Pat. No. 8,002,957, 2011) The '957 patent also teaches a hydrogen-oxygen fuel cell for detecting the presence of hydrogen, and similar use of a hydrogen fuel cell is taught in U.S. Pat. No. 4,293,399 (Belanger and Missout, "Device for Detecting and Measuring the Concentration of Gaseous Hydrogen Dissolved in a Fluid," U.S. Pat. No. 4,293,399, 1981), also incorporated by reference.

Glucose fuel cells are typically more complex that the fuel cells discussed above, as they typically require an additional chemical reaction to obtain hydrogen from the glucose molecule, the hydrogen subsequently being used as fuel. While more complicated, glucose fuel cells have particular interest for medical applications, as they have potential to operate for extended periods of time in a living organism because both the fuel (glucose) and the oxidizer (oxygen) may be available.

SUMMARY

Devices powered by fuel cells can be simplified via reduction in fuel tank size, or complete removal of fuel tanks or fuel lines, while at the same time allowing the fuel cells to operate for extended durations, if the fuel cells can obtain their reactants from the surrounding environment (meaning, the gaseous or liquid media immediately surrounding the fuel cell or the device within which the fuel cell is housed, herein referred to as just the "environment"), and if the concentration of fuel and oxidizer in the environment is maintained at a sufficiently high level. Such high concentration can be assured by exposing the environment to an atmosphere (air, or any other gas, or gas mixture, in contact with, or mixed with, the environment, other examples including the gasses used in hospitals for patient respiration, the gasses breathed by underwater divers, pockets of gasses trapped in geological features, or the "air" of other planets) that is enriched in at least one of the reactants; that is, the concentration of at least one of fuel and oxidizer has been increased compared to the pre-existing level, or compared the level normally found in the location (in the case where an entirely controlled gas mixture is employed). Note that the plural form of "reactants" may also refer to a single reactant, such as a fuel, or an oxidizer. It should be noted that many fuel cells employ oxygen as the oxidizer, and normal air on Earth, containing about 21% oxygen, is a readily-available atmosphere; thus, if air is used as the basis for forming the enriched atmosphere, typically its enrichment only requires adding fuel. However, enrichment of oxygen (or other oxidizer) can also have benefits and is assumed to be included in the concept of enrichment unless otherwise specified, as is the possibility of only enriching the oxidizer, as opposed to the fuel, in situations where the fuel is readily available (such as glucose fuel cells operating in a biological environment where glucose is available, hydrogen fuel cells operating in a gas planet atmosphere where hydrogen is available, etc.)

In a typical method, one or more devices are provided with fuel cells to generate electrical energy to operate the devices, where the fuel cells are configured to extract fuel and oxidizer ("reactants") from the surrounding environment. To assure a sufficient level of reactants, the environment is exposed to a reactant-enriched atmosphere (also referred to as just an "enriched atmosphere"), such that the environment interacts with the enriched atmosphere (typically through gas exchange) to provide a sufficient concentration of reactants to power the fuel cells operating in the environment.

In a typical situation, the devices operate in a liquid environment, and are configured such that the fuel cells can extract dissolved fuel and oxidizer from the surrounding liquid. The liquid is exposed to the enriched atmosphere, and gas exchange operates to maintain a desirable level of fuel and oxidizer dissolved in the liquid, available for extraction by the fuel cells. Gas exchange may be aided by providing an increased surface area between the liquid and atmosphere, such as occurs in the lungs or other breathing organs of organisms that respire, or by bubbling the atmosphere through the liquid, or other techniques known in the art. Environments of particular interest are those within a living organism, where small devices can be used to perform various medical operations, procedures, monitoring, or other tasks. In such cases, liquid environments exist inside bodily fluids such as blood, as well as inside cells and tissues. Living organisms also contain gaseous environments, such as inside the lungs or inside oral and nasal cavities, and devices can be provided with fuel cells that are configured to extract fuel and oxygen from the atmosphere breathed into the lungs or other parts of the body during respiration.

Depending on the fuel and oxidizer concentrations desired, in some cases the enriched atmosphere may be maintained at greater than normal atmospheric pressure, in which case the enriched atmosphere may be contained in a hyperbaric chamber. In general, this allows enrichment with a greater total amount of fuel or oxidizer, even if the percentage composition remains the same, since increasing the pressure increases the density of a gas. Where the surrounding environment is inside a living organism, increasing the pressure above normal atmospheric pressure allows providing a higher concentration of fuel than would be possible at 1 atm while still providing a sufficient concentration of oxygen for the organism's normal respiration or other metabolic processes (potentially plus additional oxygen for fuel cell use).

Various fuels can be employed. Two exemplary gaseous fuels of interest are hydrogen and acetylene, as both can be effectively used at levels that do not have toxic effects for typical living organisms. In addition to acetylene, other gasses, including some known to be medically safe because they have been used as anesthetics, provide substantial energy upon oxidation, and thus also have potential for use as possible fuels. An additional benefit of hydrogen fuel cells is that they can be very simple and durable in construction, facilitating fabrication of very small fuel cells for powering devices small enough to operate inside blood vessels, lungs, tissues, etc. Another possible fuel is glucose, which is naturally present in many living organisms. Glucose fuel cells would, in a typical biological setting, be oxygen limited rather than fuel limited. The amount of power available to the device, and the amount of oxygen left over after device usage for the organism, could be increased by increasing the concentration of O2, and/or the pressure of the atmosphere.

Systems to operate one or more devices include at least one fuel cell to generate power for the device(s), the fuel cell(s) being configured to extract fuel and oxidizer from the device's surrounding environment. The environment may be bounded so as to be distinct from the general location in which the system operates; as examples, the environment could be a body of liquid bounded by the extent of the liquid, or could be bounded by being inside a living organism or inside a particular tissue or organ of such organism. The system also typically includes an enclosure or other atmosphere-constraining structure (e.g., a breathing mask, an intubation system, or an aeration system to help fuel dissolve into the device environment) for providing an enriched atmosphere, in which the levels of fuel gas, oxidizer, or both are increased above the levels found in normal air or found in the ambient surrounding gas mixture of the location where the system operates (in the case of systems for use in locations other than on the surface of the Earth). It should be noted that the system need not necessarily enclose the enriched atmosphere, but rather can constrain the atmosphere sufficiently to maintain an increased concentration of reactants nonetheless, since an equilibrium will be reached based on the rate of reactant input and the rate of reactant escape. For example, fish tanks are oxygenated via aeration, but do not require a sealed enclosure to benefit from this aeration.

In some cases, the atmosphere-constraining structure includes a pressure vessel that allows the enriched atmosphere to be maintained above normal atmospheric pressure. Henry's Law states that the solubility of a gas in a liquid is directly proportional to the pressure of that gas above the surface of the solution. In other words, by increasing the pressure of the atmosphere, the amount of fuel that can be dissolved into a liquid environment is increased, which can help provide higher levels of fuel than would be possible at ambient pressure.

The fuel cells used in the devices are configured to extract both fuel and oxidizer reactants from the environment surrounding the fuel cell. These extracted reactants are made available to a reaction cell that generates power from them, using oxidization-reduction reactions such as well-known in the art. The reaction cell may be conventional in its configuration and operation.

The reactants are extracted using a fuel-extracting element, which extracts fuel from the surrounding environment for presentation to an anode side of the reaction cell, and an oxidizer-extracting element, which extracts oxidizer (typically oxygen, but hydrogen peroxide, halogens, and many other substances can serve as oxidizers) from the surrounding environment for presentation to a cathode side of the reaction cell. To avoid contamination and other adverse reactions, the extracting elements are generally designed to extract, to the extent feasible, only the desired molecules from the environment. Selectively permeable membranes (which can consist of, e.g., solid palladium for hydrogen, but many selectively permeable membranes are well-known in the field, from Nation® to single-atom thick layers of graphene and boron nitride) (Hu, Lozada-Hidalgo et al., "Proton transport through one-atom-thick crystals," Nature, 7530, 2014) and sorting rotors (rotors that rotate from the external environment to the internal portion of a device, in this case, for example, picking up H2 from the environment and releasing it in the fuel cell) (Freitas, "Nanomedicine, Volume I: Basic Capabilities," Landes Bioscience, 1999) are two examples of extracting elements that could be employed. Many natural and engineered materials reversibly bind hydrogen and so could be used for sorting rotors, including zeolites and other microporous structures, (Lan, Li et al., "RPM3: a multifunctional microporous MOF with recyclable framework and high H2 binding energy," Inorg Chem, 15, 2009) and carbon nanotubes.

DETAILED DESCRIPTION

Method

Figure 1:
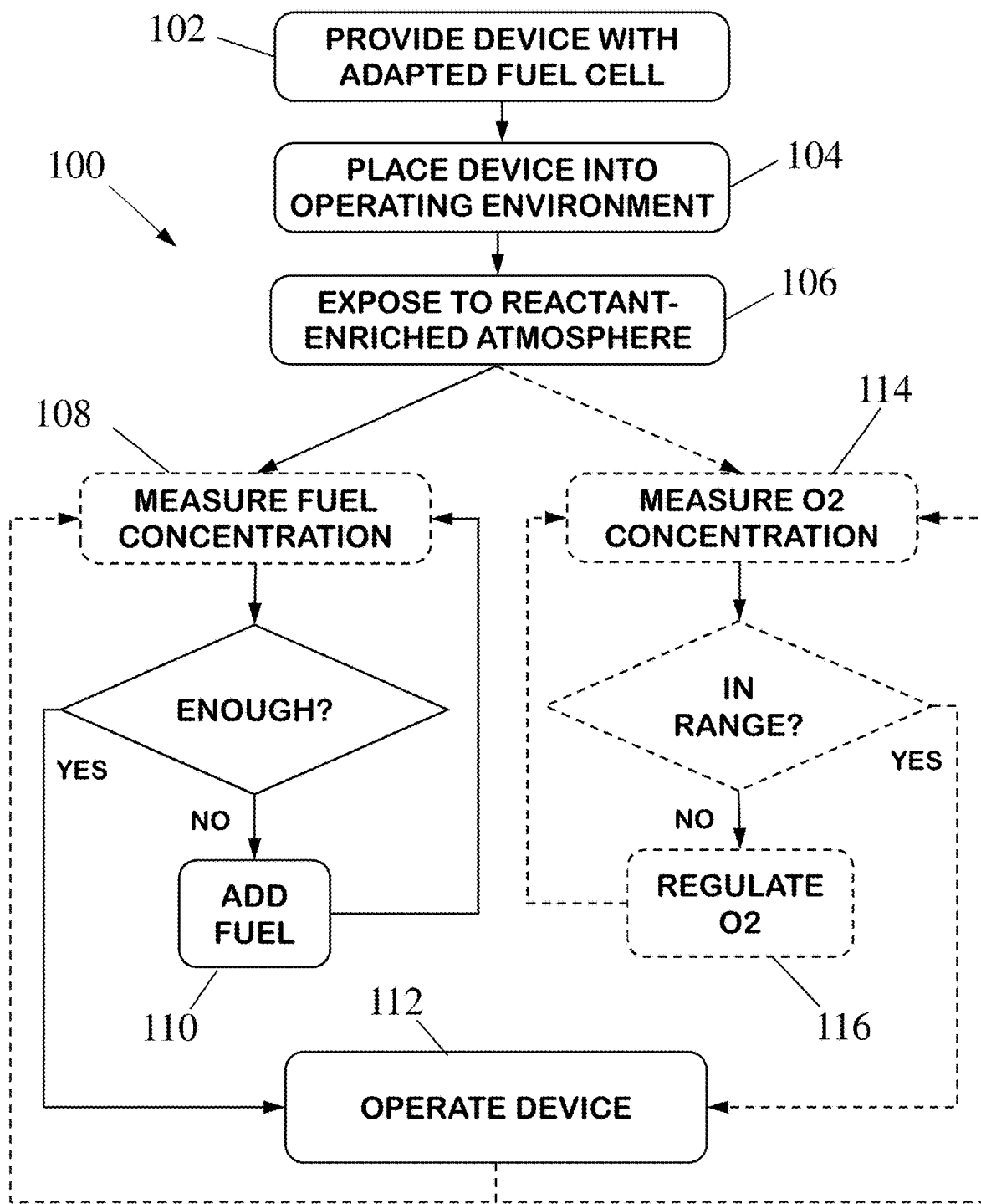
FIG. 1 illustrates steps of a method for powering and operating a device, using a fuel cell operating in an environment where the presence of reactants for the fuel cell is increased by exposure to a reactant-enriched atmosphere.

FIG. 1 illustrates a basic method 100 for powering a device; while the method is discussed with reference to a single device, in many situations multiple devices will be powered, and the method has utility for powering vast numbers (thousands, millions, or even greater numbers) of devices. The device is provided 102 with a fuel cell that is designed to accept molecules of a fuel, such as hydrogen or acetylene, and an oxidizer, such as oxygen, from the local environment. Examples of such fuel cells are discussed with regard to FIGS. 3-5. For the exemplary present discussion, the fuel is assumed to be a gaseous fuel such as hydrogen or acetylene, and the oxidizer is assumed to be oxygen. Additionally, in this example, the addition of fuel is focused on. The assumption that this carries with it is that the fuel, not the oxidizer, is the limiting factor in this example. In other examples this need not be true; enrichment may be of fuel, of oxidizer, or of both, to the same, or to varying degrees.

Figure 2:
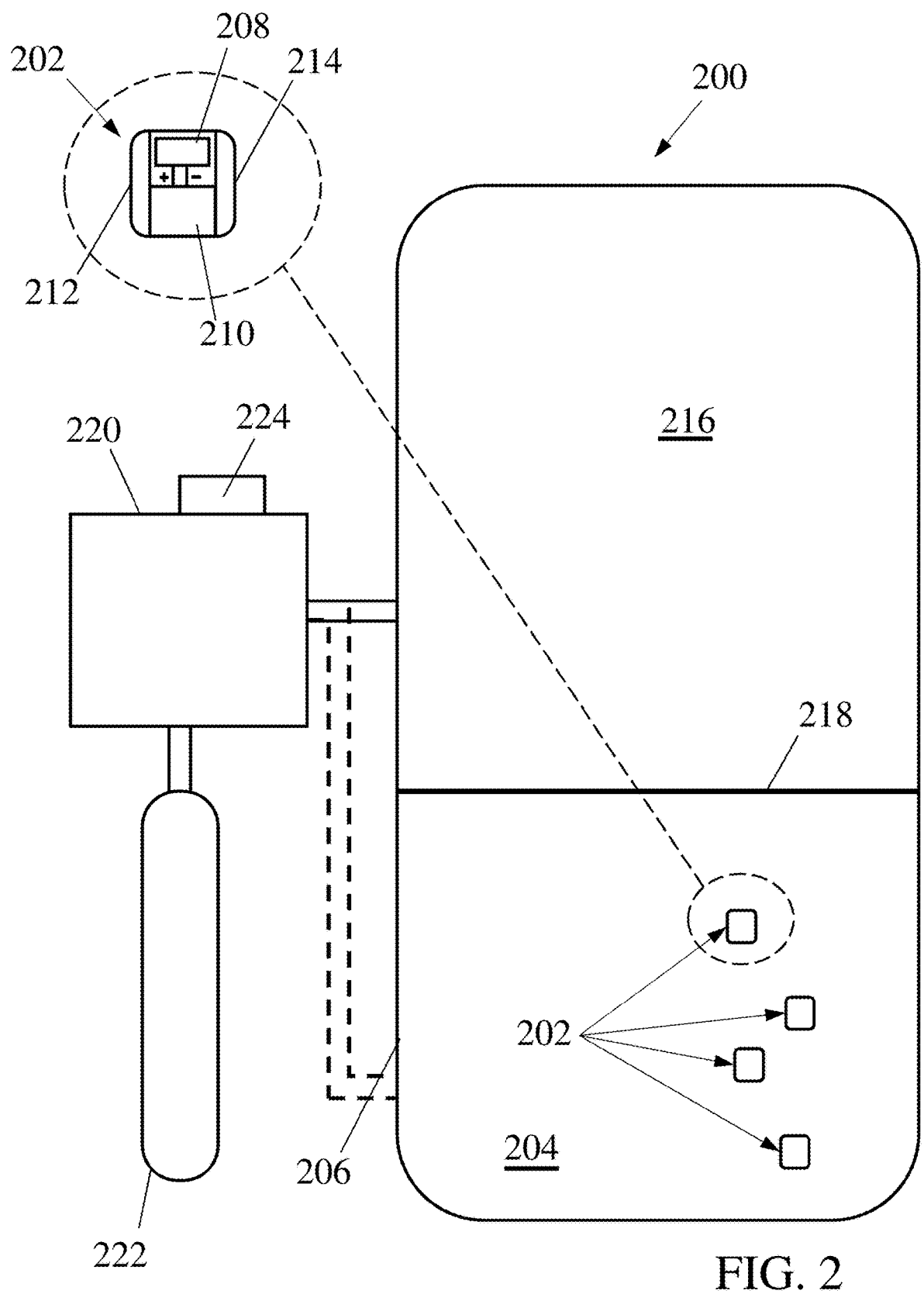
FIG. 2 illustrates one example of a system that could be employed to carry out a method such as shown in FIG. 1. The system has a number of devices powered by fuel cells that extract fuel and oxidizer reactants from the liquid environment in which they operate. The liquid, in turn, is supplied with sufficient concentrations of reactants by gas exchange with a reactant-enriched environment enclosed in a sealed chamber (optional).

Once provided 102 with the adapted fuel cell, the device is then placed 104 into an operating environment, which in this example is assumed to be a body of a liquid in which the device containing the fuel cell is to operate (such as illustrated in FIG. 2). For effective operation, the environment needs to have sufficient available fuel and oxygen to react in the fuel cell to provide power for the device. To provide sufficient concentrations of fuel and oxygen, the operating environment is exposed 106 to a reactant-enriched atmosphere, in which the concentration of at least one of the reactants for the fuel cell has been increased significantly above the levels found in normal air. If the available atmosphere is assumed to be air, then adequate oxygen may be available, but the naturally occurring concentration of hydrogen or acetylene in air is typically negligible, and thus at least fuel must be added to provide the enriched atmosphere. In some cases, additional oxygen may be needed as well. Since the operating environment is exposed to the enriched atmosphere, as long as the fuel is soluble in the liquid, it will diffuse into the liquid, providing fuel that can be extracted for use by the fuel cell. Similarly, when there is sufficient oxygen in the enriched atmosphere (either from existing oxygen in air prior to enrichment or added oxygen), the oxygen is soluble in the liquid and diffuses therein, providing oxygen that can be extracted for use by the fuel cell. Note that the gas exchange process can be facilitated in many ways over a simple system of a still fluid in a reservoir with an enriched atmosphere above it. For example, in a medical context, gas exchange between the atmosphere and the blood happens quickly because of the large surface area provided by the lungs (or other respiration organs of biological organisms) and the active mixing (convection) of gasses caused by inhaling and exhaling. In other contexts, any of the many varieties of surface or subsurface aeration could be used, which include bubbling the enriched atmosphere through the liquid, or spraying the liquid, like a fountain, into the enriched atmosphere.

The level of fuel is optionally measured 108 to determine whether there is enough to operate the device, and if necessary, additional fuel is added 110. Depending on the situation, the fuel could be added by replacing existing gas in the enriched atmosphere with fuel, or by simply adding fuel to the existing gas. The measurement step 108 may not be needed, such as in cases where various parameters, such as the gas solubility and diffusion constant are known, as is the effectiveness of a given system of aeration, gas exchange, or the like, if present, so that it can be assumed that adding fuel at a given rate or in a given amount raises the concentration to a suitable level without having to measure it. If the fuel consumption by the fuel cell is significant, such as when large numbers of devices are employed, the fuel consumption rate should be factored into the calculations.

When it is determined that a sufficient fuel concentration exists, then the device is operated 112. If the fuel consumption of the device (or multiple devices) relative to the amount of environmental fuel available makes it likely that fuel depletion is a concern, then the fuel continues to the measured 108 (optionally—as noted, calculations could estimate the fuel consumption and allow adding additional fuel based on such calculations without measurement) and more fuel added 110 as needed. Note that operating the device can also mean changing its power usage and hence, fuel consumption. The device need not be only "on" or "off", rather, it may engage in whatever activity the available fuel levels permit (such as entering a "sleep" or "standby" mode if fuel levels are low).

In addition to fuel, the fuel cell in this example uses oxygen, and thus a sufficient supply of oxygen is needed. Since air on Earth is 21% oxygen, oxygen is readily available in many situations and thus may not need to be added when air is used as the basis for forming the enriched atmosphere. As mentioned herein, oxygen, or any other oxidizer of use, may also be enriched. However, excessive levels of oxygen may create hazards (because the fuel/oxygen mix has the potential to be flammable or explosive, as discussed herein). Thus, the level of oxygen may need to be regulated. In such cases, the oxygen concentration is measured 114 to determine whether it falls within a specified range. If not, then the oxygen level is regulated 116 to bring it within range. Such regulation can be done by introducing more air into the enriched atmosphere, directly adding oxygen from a source, or other techniques well known in the art of regulating gas mixtures.

As noted herein, above certain concentrations of fuel and oxygen, the mixture can be flammable, or explosive, and thus appropriate precautions to avoid sources of ignition such as sparks may be needed. For hydrogen fuel, a concentration of hydrogen above 4% is flammable or explosive where sufficient oxygen is available. Hydrogen concentrations over 75% are not considered flame or explosion hazards though; such mixtures being considered too rich to burn. For acetylene fuel, the risk of fire or explosion occurs at concentrations above 2.5%. Unlike hydrogen, there is no upper limit above which acetylene will not burn or explode. However, these figures should be taken as empirically derived guidelines only. The exact concentrations which do or do not pose a hazard can vary depending on temperature, pressure, and other factors. Those skilled in the relevant arts will appreciate that the safety precautions to be taken, and testing conducted to determine the risks of a given system, are well-known.

Apparatus

FIG. 2 illustrates one example of a system 200 for implementing a method such as discussed above; for purposes of illustration, the use of hydrogen fuel and oxygen oxidizer are assumed in this example. The system 200 serves to power a number of devices 202 located within a liquid operating environment 204, contained in an enclosure 206. Each of the devices 202 has circuitry 208 powered by a fuel cell 210, which has a fuel-extraction element 212 and an oxidizer-extraction element 214, both of which are positioned on the device 202 so as to be exposed to the environment 204. The enclosure 206 is provided with a reactant-enriched atmosphere 216 which is in gas exchange with the operating environment 204 via a liquid surface 218.

The atmosphere 216 is maintained by a gas regulator 220, which communicates with the interior of the enclosure 206 and with a source of hydrogen such as compressed fuel tank 222 (while hydrogen is assumed in the present description, acetylene or other appropriate fuel gas could be employed). The gas regulator 220 illustrated can also draw in air via an air intake 224, although oxygen could be supplied from a pressurized tank or other source. The gas regulator 220 may monitor the gas composition of the enriched atmosphere 216 and adjust the concentration by adding more hydrogen and/or air/oxygen to maintain the desired composition to supply a sufficient concentration of dissolved hydrogen and oxygen in the liquid operating environment 204. If the enclosure 206 can sustain a pressure elevated above the ambient pressure, the gas regulator 220 could provide such an elevated pressure for the enriched atmosphere 216. Optionally, aeration or some other process could be used to increase the speed of the gas exchange of enriched atmosphere 216 with the liquid environment 204; for example, the gas mixture could be delivered into the enclosure 206 below the surface of the liquid 204 (as indicated by the supply line shown in dashed lines) such that the gas mixture bubbles through the liquid 204. Note that hydrogen oxidizes to form water, so where the liquid 204 is water or mostly water, there would likely be no need to remove the fuel cell "waste" when using hydrogen fuel. However, acetylene produces water and carbon dioxide. Other fuels also produce waste products which might preferably be removed. In such cases, the gas regulator 220 and air intake 224 could be adapted to also serve as an exhaust port; alternatively, a separate mechanism could be added to perform the task of removing waste products.

Figure 3:
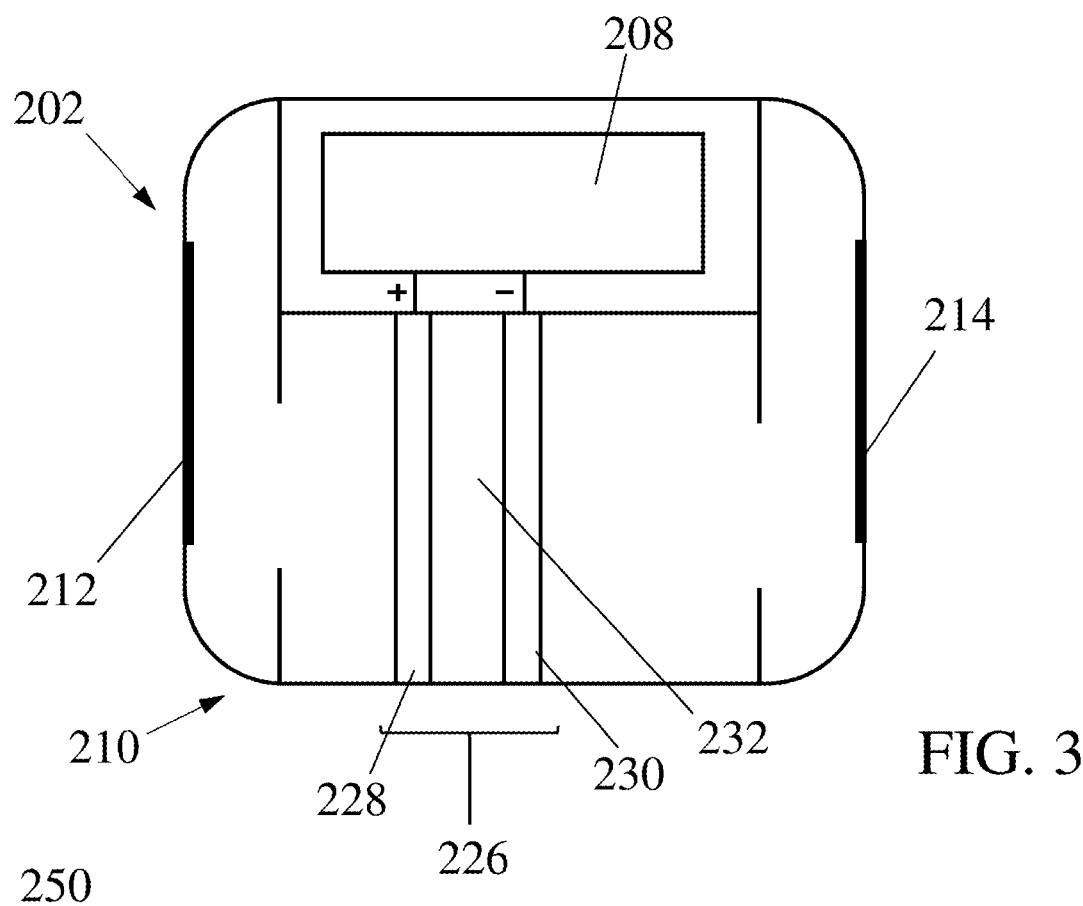
FIGS. 3-7 illustrate examples of devices powered by fuel cells that could be used in the system shown in FIG. 2.

FIG. 3 is an enlarged view showing further details of one example of a device 202, where the fuel cell 210 has a reaction cell 226 provided with an anode 228 and a cathode 230, typically with an electrolyte 232 interposed therebetween. The anode 228 and the cathode 230 are both connected to the circuitry 208. The anode 228 is exposed to hydrogen extracted from the surrounding liquid environment 204 by the fuel-extraction element 212, and the cathode 230 is exposed to oxygen extracted from the environment 204 by the oxidizer-extraction element 214. The circuitry 208 may include well-known components that serve to regulate the electrical current supplied, such as filtering components to remove transient energy spikes or gaps, and/or energy storage components such as batteries or storage capacitors to provide energy during brief periods when the reaction cell 226 may not be actively generating electrical power.

Figure 4:
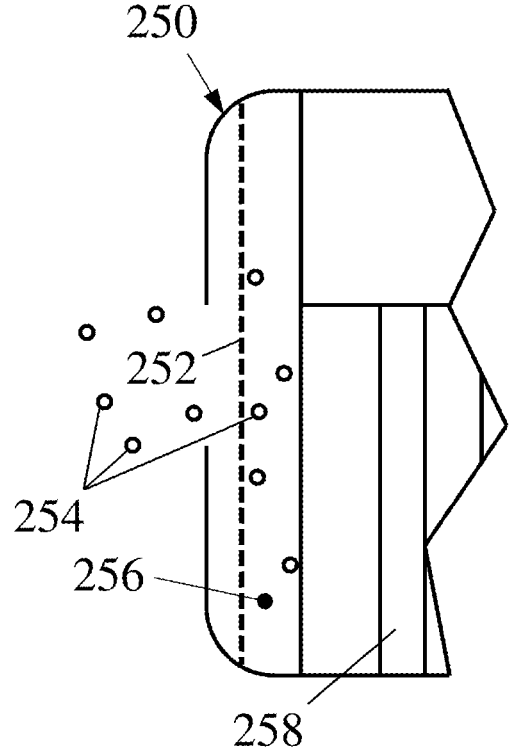
Figure 5:
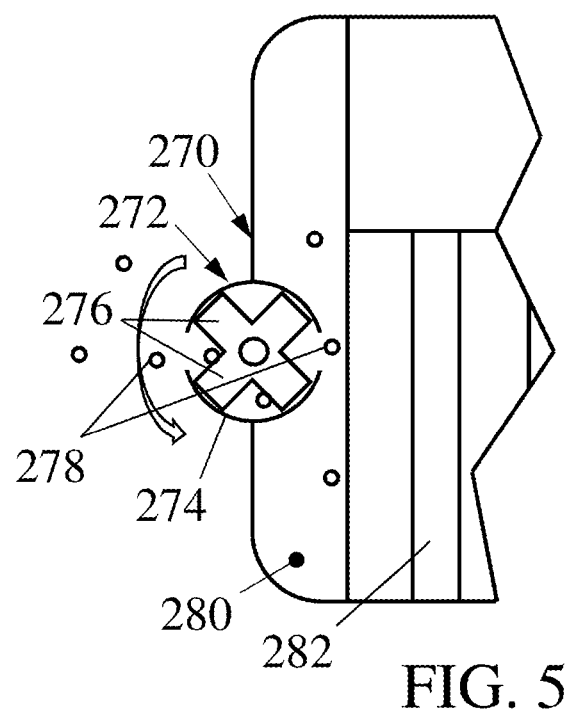

FIGS. 4 and 5 illustrate two examples of fuel-extraction elements (250, 270) which could be employed for the fuel-extraction element 212 shown in FIGS. 2 and 3; similar structures could be employed to provide the oxidizer-extraction element 214. Fuel-extraction element 250 shown in FIG. 4 employs a selectively-permeable membrane 252 that allows hydrogen gas molecules 254 to pass therethrough, but which blocks other molecules. The hydrogen gas 254 passes into a chamber 256 where it is available to a fuel cell anode 258. As the reaction of the fuel cell consumes hydrogen 254 in the chamber 256, the greater concentration in the environment outside the membrane 252 causes more hydrogen 254 to diffuse through the membrane 252.

Fuel-extraction element 270 shown in FIG. 5 is a sorting rotor 272, which rotates within a gate 274. As arms 276 of the rotor 272 turn, they absorb hydrogen molecules 278 from the environment, and upon reaching a chamber 280, release them. Again, as the fuel cell consumes hydrogen at an anode 282, it decreases the concentration in the chamber 280 and allows hydrogen 278 absorbed by the arms 276 to be released in the chamber 280, where the concentration of hydrogen 278 has been lowered by consumption.

Figure 6:
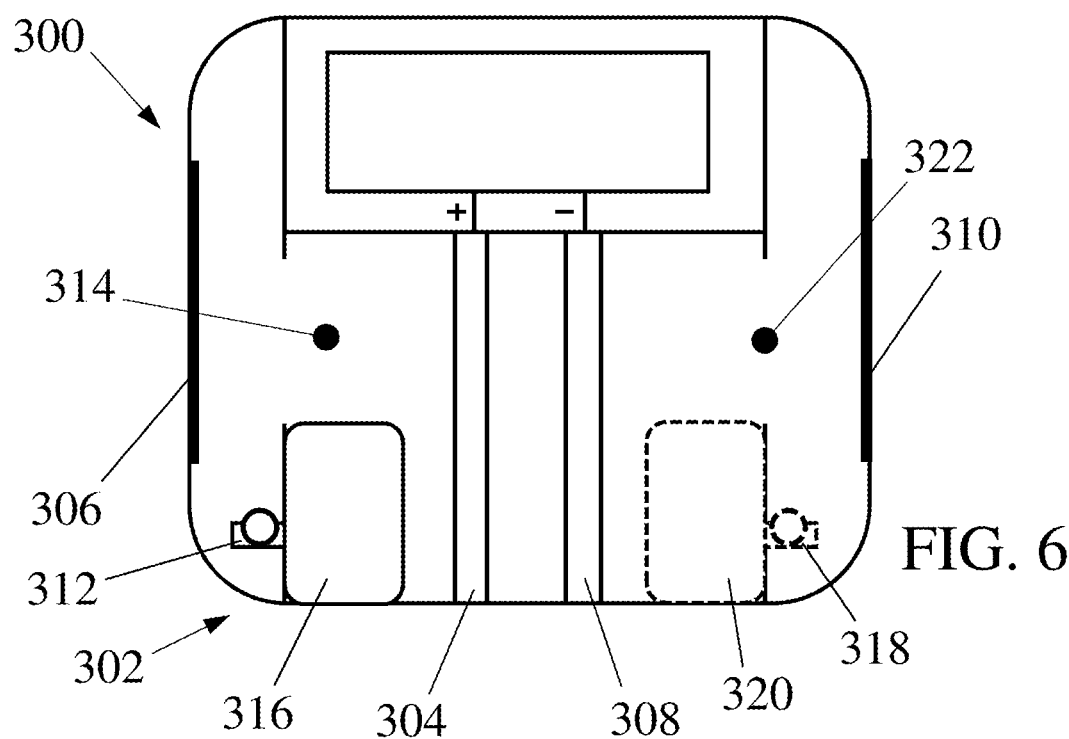

FIG. 6 illustrates an alternative device 300, which shares many features in common with the device 200 shown in FIG. 3, but which is adapted to situations where one or both of the reactants may be only intermittently available. For example, consider devices powered by fuel cells that serve a medical purpose, such as monitoring blood pressure or glucose levels. Due to the potential need for, e.g., specialized gasses and their safe handling, refueling safely may require the supervision of a physician or technician in a hospital or other specialized setting. However, the devices are desired to continue functioning after the patient leaves the specialized setting, so some form of energy storage is required, although refueling may be as often as needed. The device 300 again has a fuel cell 302, with an anode 304 that receives fuel from a fuel-extraction element 306 that extracts the fuel from the environment, and has a cathode 308 that receives oxidizer from an oxidizer-extraction element 310 that extracts the oxidizer from the environment. When fuel is plentiful, a fuel pump 312 operates to pump excess fuel present in a fuel chamber 314 into a fuel storage tank 316. Similarly, the device may have an oxidizer pump 318 that pumps excess oxidizer into an oxidizer storage tank 320 from an oxidizer chamber 322. When the device 300 operates under conditions where sufficient fuel for operation is unavailable in the local environment, and thus a sufficient supply cannot be provided by the fuel-extraction element 306 to sustain operations, the fuel pump 312 can be reversed to release fuel from the fuel tank 316 into the fuel chamber 314, so as to be available to the anode 304. In a similar manner, when the device is provided with an oxidizer pump 318 and oxidizer tank 320, the oxidizer pump 318 can be operated to release oxidizer into the oxidizer chamber 322 so as to be available to the cathode 308 when insufficient oxidizer is available in the environment to provide a sufficient supply from the oxidizer-extraction element 310.

Figure 7:
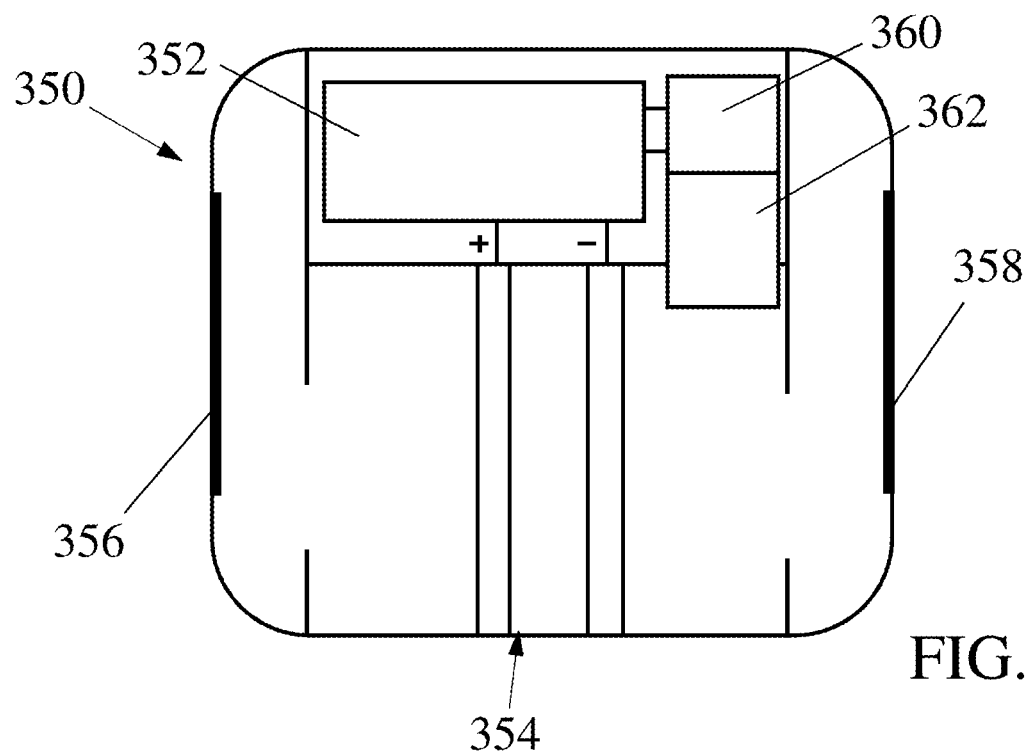

While storage of reactants is shown in FIG. 6, alternative energy storage techniques, such as storing electrochemical energy in a battery, storing mechanical energy in a spring, or storing kinetic energy in a flywheel, could be employed. In such cases, the device can be provided with an energy converter (which could be either an integrated unit or made up of individual converters) that can convert electrical energy generated by the fuel cell into stored potential energy, when reactants are available to allow the fuel cell to generate more electrical energy than the fuel cell needs to for operation, and can convert such stored potential energy back into electrical energy, to power the device when concentrations of reactants in the environment are not sufficient for the desired level of operation. FIG. 7 illustrates one example of such a device 350, which is in many ways similar to the device 202 shown in FIG. 3. The device 350 again has circuitry 352 powered by a fuel cell 354, the fuel cell 354 obtaining reactants from the surrounding environment via a fuel-extraction structure 356 and an oxidizer-extraction structure 358. When fuel and oxidizer are available, the generating capacity of the fuel cell 354 exceeds the power requirements of the circuitry 352, and excess energy is passed to an energy converter 360 which converts it to a form suitable for storage in an energy storage element 362. When operating in conditions where available fuel and/or oxidizer are insufficient to operate the circuitry 352, the energy converter 360 can convert some of the stored energy from the energy storage element 362 into additional electrical energy to power the circuitry 352. While a single energy converter 360 is shown, in some cases it may be more efficient to employ separate converters, one to convert electrical energy to stored potential energy, and one to convert the stored potential energy to electrical energy. In other cases, such as when the energy converter is a charger for a battery that stores the potential energy as chemical energy, the battery may be designed to directly power the circuitry without any conversion; in effect, the battery itself performs the energy conversion.

Medical Applications

Figure 8:
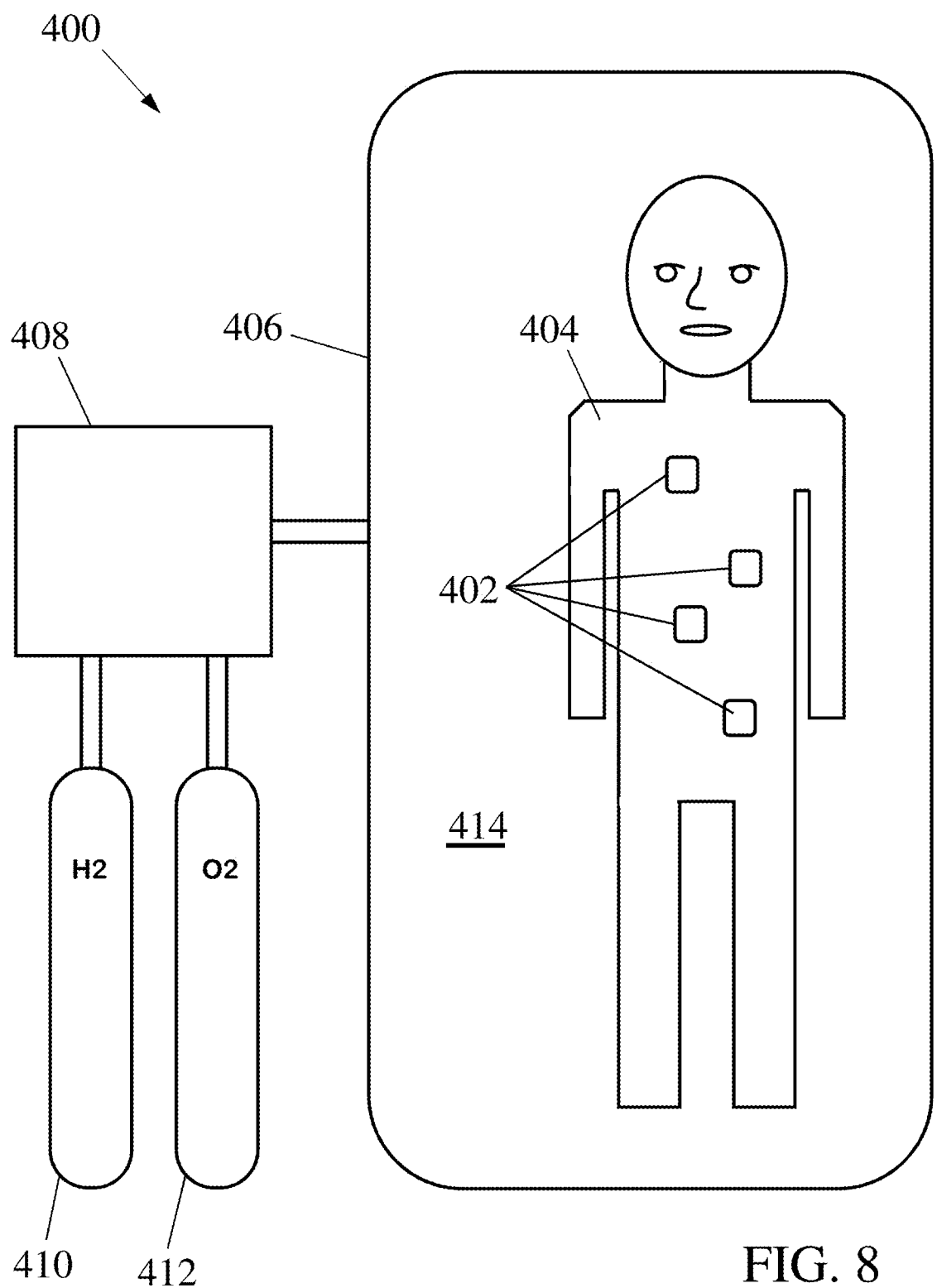
FIGS. 8 & 9 illustrate examples of systems for powering and operating devices used for medical purposes, where the operating environment of the devices is inside a living organism. Respiration of the organism with a reactant-enriched atmosphere provides concentrations of fuel and oxidizer in the environment where the devices operate to allow them to be powered by fuel cells that extract fuel and oxidizer from the local environment of the devices.

One area of particular interest is in powering small robotic devices for use in medical tasks. FIG. 8 shows one example of a system 400 for powering a number of devices 402, where the operating environment of the devices is within a biological organism 404. The operating environment could be confined to a particular location, such as within a particular organ (including blood or the circulatory system), cell type, or any of many other ways of defining areas of interest, or could extend across multiple such locations, including throughout the organism 404. While the operating environment of device 402 would typically be a liquid when the device 402 is being used in a medical context, operation in a gaseous environment is possible, such as if the devices 402 are operating in the lungs of the organism 404, inside oral or nasal cavities, or on the surface of the organism's skin.

While various fuels could be employed, the system 400 illustrated is designed to employ hydrogen as the fuel. Since the concentration of hydrogen in air is insufficient to power the devices 402, additional hydrogen is made available. This can be accomplished by placing the organism 404 within a sealed enclosure 406 with a gas composition regulated by gas regulator 408. Gas regulator 408 adds hydrogen, from a hydrogen supply tank 410, and optionally oxygen, from an oxygen tank 412, providing an enriched atmosphere 414 within the enclosure 406 that has the proper proportions of hydrogen and oxygen to both adequately fuel the devices 402 (in situations where a different fuel and/or oxidizer is employed, appropriate supplies of such reactant(s) would replace the reactant tanks 410/412). To maintain the enriched atmosphere 414, the gas regulator 408 could perform the measuring and adjusting steps (108, 110, 114, & 116) shown in FIG. 1, and could maintain the atmosphere 414 at above ambient pressure if such increased pressure can be accommodated by the enclosure 406. In the situation illustrated in FIG. 8, the organism 404 exchanges gasses with the enriched atmosphere 414 through respiration, and the devices 402 can obtain power by reacting the hydrogen and oxygen either drawn into the lungs or dissolved in the fluids of the organism 404.

Figure 9:
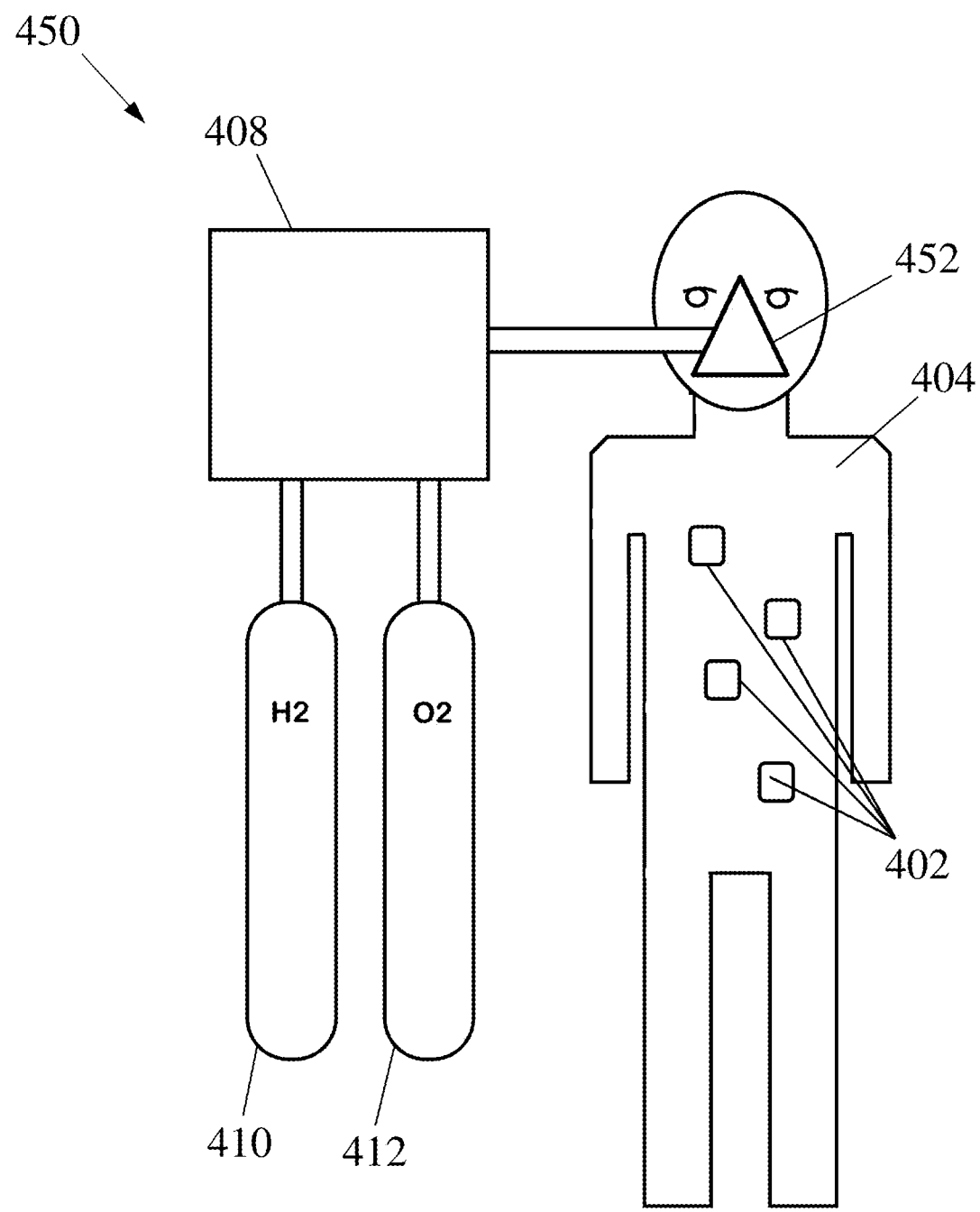

FIG. 9 shows an alternative system 450, where an enclosure 452 is provided by a mask worn by the organism 404; otherwise, the components are the same as for the system 400. Operation of the system 450 is similar to that of the system 400, but the use of a mask 452 may limit the system 450 to operation at normal atmospheric pressure. Similarly, a more open atmosphere-constraining structure such as an inhalation tube could be employed.

Gas Concentrations and Safety

Oxygen normally occurs in air at a proportion of 21%. Note however, that it is routine to use higher concentrations of oxygen (up to 100%, or even effectively higher if pressure is increased) for, for example, patients undergoing anesthesia or for specific underwater diving purposes. There can be risks associated with the inhalation of high levels of oxygen, however, there are also studies that claim, for example, pure O2 used in an operating room setting is not only not harmful, but actual reduces certain risks associated with surgery. So, in a medical setting, care should be used to test the safety of a particular protocol involving levels or percentages of oxygen that vary substantially from that found in normal air. Also note that oxygen can be used for breathing in significantly lower concentrations than 21% when pressures are high enough (e.g., Hydreliox and Hydrox).

Hydrogen has been used in gas mixes for breathing at high concentrations and there is no known concentration that has been found directly harmful. The primary danger associated with hydrogen is that it becomes potentially explosive in the presence of oxygen at concentrations above about 4%. Presumably because of the explosion risk, previous use of hydrogen for inhalation has been done in a low-oxygen environment, such as with high-pressure deep diving gas mixes including Hydreliox (49% H, 50.2% He, & 0.8% O), and Hydrox (96% H, 4% O). (James H. Dougherty, "The Use of Hydrogen as an Inert Gas During Diving: Pulmonary Function During Hydrogen-Oxygen Breathing at Pressures Equivalent to 200 Feet of Sea Water," 801, 1974; Gerard, Comet et al., "LONG TERM HYDROGEN SATURATION DIVE_HYDRA IX," Undersea and Hyperbaric Medical Society, Inc. Joint Annual Scientific Meeting with the International Congress for Hyperbaric Medicine and the European Undersea Biomedical Society, Amsterdam, N L, 1990) Very low percentages of O2 can be employed in such cases to avoid the risk of explosion, when the pressure is high enough that the total amount of O2 is still sufficient for respiration or other metabolic processes. Assumedly due to the risk of fire or explosion, the inventor is not aware of any literature that uses concentrations of H2>4%, and concentrations of O2>4%, at the same time.

Acetylene has been used in breathing mixes. Acetylene is a non-toxic gas that has no chronic harmful effects even in high concentrations. Acetylene has been used as an anesthetic in concentrations up to 70%, although lower concentrations (e.g. 33-35%) will also cause unconsciousness eventually (5-7 minutes, respectively). Inhalation of 10% acetylene for 1 hour is not known to have any adverse effects. For Acetylene, there is a fire/explosion risk in the presence of oxygen when the concentration of acetylene gets above about 2.5%.

Other anesthetic gasses also show promise as possible fuel sources to power devices used for medical functions. Ethylene has been used as an anesthetic (at concentrations of 80% ethylene and 20% oxygen, lower concentrations of ethylene do not necessarily result in anesthesia), as has cyclopropane (at 3-40%), methoxypropane (methyl propyl ether), and diethyl ether (at 3-15%), among other gasses. All these gasses are flammable or explosive under certain conditions (which generally overlap with their medical concentrations), but are otherwise relatively safe from a medical perspective when used at the appropriate concentrations. The fact that they are flammable is a good indication that they could be useful as a fuel, since their oxidation releases substantial energy. In fact, in addition to H2, at least acetylene and dimethyl ether have been used in fuel cells. (Cearnaigh, Dumont et al., "High-Performance Direct Dimethyl Ether Fuel Cell Operating with an Advanced Activation Process," 228th ECS Meeting, Phoenix, Ariz., US, 2015)

Gas Solubility

Henry's Law states that the amount of dissolved gas in a liquid is proportional to its partial pressure in the gas phase. The proportionality constant (Henry's Constant, or kH) depends on the solubility of the gas in the liquid. These relationships can be stated as:

$$[gas(aqueous)] = solubility(\alpha) * partial\ pressure(P) \qquad Eq.\ 1$$

and $$kH = [gas(aqueous)] / partial\ pressure(P) \qquad Eq.\ 2$$

In considering the total amount of power that fuels cells could provide to devices in a medical context, another consideration is the diffusion constant of the fuel. While the solubility or Henry constant can address fuel concentrations at equilibrium, the fuel cells will be using both fuel and oxidizer, and so will deplete the reactants from their immediate surroundings. This creates a gradient, where the higher concentration coming from the enriched atmosphere replenishes the reactants used by the fuel cells. How fast this gradient can replenish the supply depends in part on the diffusion constant of the fuel. Diffusion would be limiting over substantial distances in the absence of convection. However, convection is present in most biological systems, from the cardiovascular system of animals, to mechanical agitation of media in cell culture. Thus, the distances over which diffusion must act become very small, making solubility a more important factor.

The Henry constants and diffusion constants (where available) for several potential fuel gasses follow. Water is used as a proxy for blood or other tissues.

TABLE 1

Henry Constants and Diffusion Constants for Various Gasses in Water

| Gas | Henry Constant | Solubility Relative to O2 | Diffusion Constant ×10−5 cm2/s (at 25 C.) |
|---|---|---|---|
| C2H2 (acetylene) | 0.04 mol/L * atm | 30.7X | 1.99 |
| C2H4 (ethylene) | 0.0047 mol/L * atm | 3.6X | 1.87 |
| Cyclopropane | 0.011 mol/L * atm | 8.5X | |
| Diethyl ether | 0.78 mol/L * atm | 600X | 0.88-0.93 |
| H2 (hydrogen) | 0.00078 mol/L * atm | 0.6X | 4.5-5.11 |
| Methyl propyl ether | 0.68 mol/L * atm | 523X | |
| O2 (oxygen) | 0.0013 mol/L * atm | 1X | 2.0-2.42 |

Gas Content of Tissues when Breathing Enriched Atmosphere

The Henry constants in water (which is used as a proxy for blood) for many of the exemplary gasses listed herein are higher, in some cases far higher, than that of O2. All other things being equal, that would indicate that, if the atmosphere was enriched with one of these gasses at percentages comparable to the O2 present, the concentrations of these gasses in aqueous systems would be several times higher than that of O2 (with the exception of H2, which has a lower Henry constant than water). This would be true for many aqueous systems, even biological ones, but not completely accurate where blood is concerned. This is because blood contains heme, which allows it to bind much more oxygen than would be soluble in plain water.

In blood, due to heme's oxygen carrying capability, and its dissociation curve (heme releases more O2 into the blood as the blood plasma levels of O2 decrease), O2's partial pressure is higher than would be expected based on the data for water. However, since much of the O2 is bound to heme, the partial pressure of O2 in plasma is not as much higher as might be expected given heme's O2 carrying ability. Rather, perhaps the biggest difference that heme causes is to help offset the gradient caused by metabolic usage of O2 via the gradual release of O2 as blood travels from the arterial to the venous side of the circulatory system.

It should be noted that many conventionally-used measures of blood O2, such as when measuring in terms of ml of O2 per liter of blood, or oxygen saturation (which is a measure of the percentage of heme binding sites that contain O2), are not particularly useful for purposes of determining available oxygen for powering devices, as they do not describe the concentration of soluble O2. Molar concentration in plasma is a more useful unit so that available moles of O2 can be compared to available moles of H2 for reaction.

For water at 37 C, assuming air (21% O2) is in contact with the water, dissolved O2 is about 6.5-7.6 mg/l. ("Air Solubility in Water," Engineering ToolBox, Engineering ToolBox, 2004); ("TWRI Book 9," U.S. Geological Survey, 1998); (Vendruscolo, Rossi et al., "Determination of Oxygen Solubility in Liquid Media," ISRN Chemical Engineering, 2012) At 6.5 mg/l, since O2's molecular weight is ~32 g/mol, this is a concentration of:

$$0.0065 \text{ g/l}/32 \text{ g/mol} = 2 \times 10^{-4} \text{ M} = 200 \text{ uM} \quad \text{Eq. 3}$$

In blood, when heme is 75% saturated (venous blood), the oxygen concentration in plasma, CP, is 0.053 mM=530 uM. Expressed as partial pressure:

$$PO2 = CP/\alpha; \quad PO2 = 0.053/1.3 \times 10^{-3} \approx 41 \text{ mmHg} \quad \text{Eq. 4}$$

Arterial blood plasma has PO2~=100 mmHg=1,325 uM=1.325×10⁻³ M.

Figure 10:
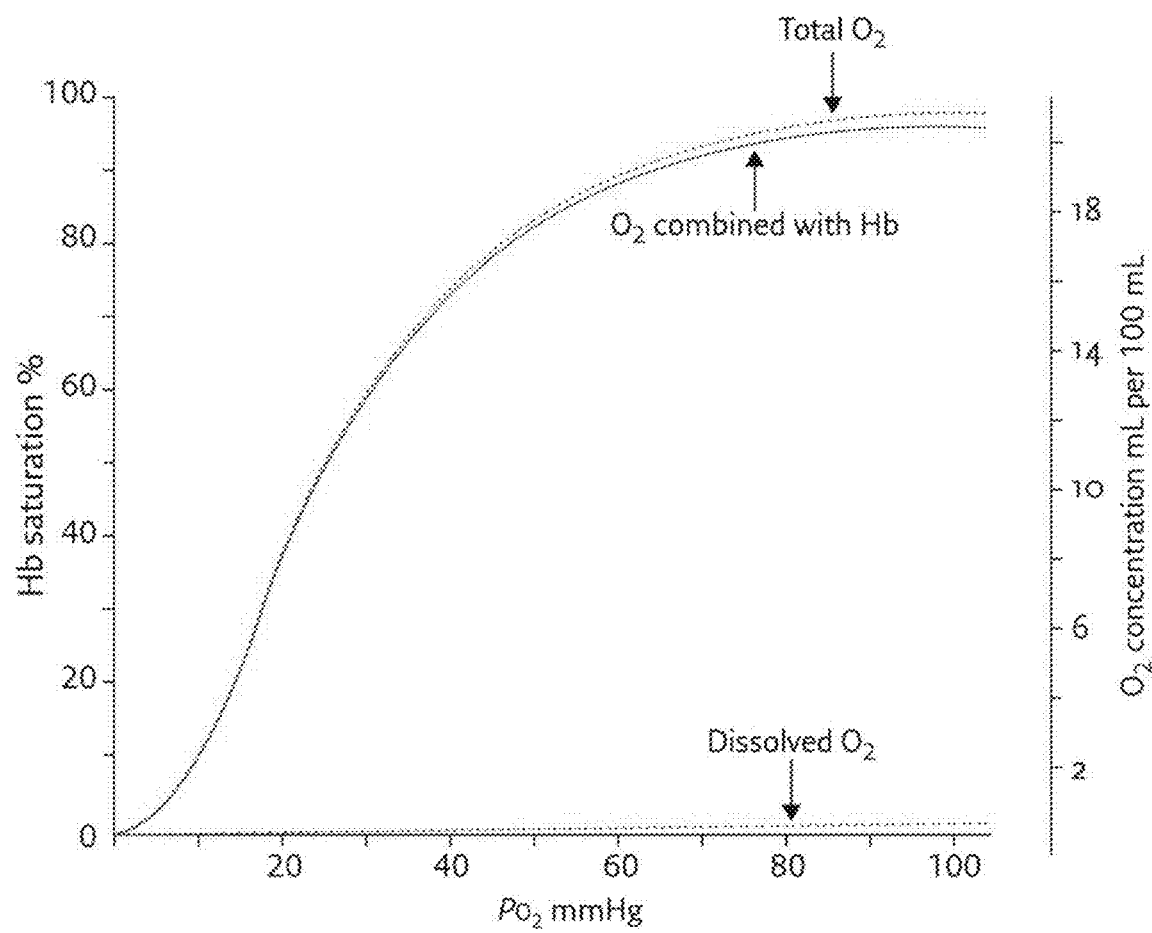
FIG. 10 is a graph comparing the portion of oxygen dissolved in blood plasma with the portion of oxygen bound to hemoglobin, as the partial pressure of oxygen contained in the blood varies.

Even though blood can carry far more O2 than water can, its carrying capacity does not result in a linear increase in CP because about 98% of the O2 in blood is reversibly bound to heme. (Pittman, "Oxygen Transport," Regulation of Tissue Oxygenation, San Rafael, Calif., US, Morgan & Claypool Life Sciences, 2011) The dramatic difference between total O2 and plasma (dissolved) O2 can be seen in the graph of FIG. 10, which compares dissolved and chemically bound oxygen for increasing amounts of oxygen in blood. While the proportion of bound oxygen increases dramatically, the proportion of dissolved oxygen changes far less.

The discussion of partial pressure of O2 in blood is informative for operation of devices in blood or similar fluids. However, PO2 values vary significantly from tissue to tissue. Table 2 lists typical PO2 values for several tissue examples. (Carreau, El Hafny-Rahbi et al., "Why is the partial oxygen pressure of human tissues a crucial parameter? Small molecules and hypoxia," J Cell Mol Med, 6, 2011)

TABLE 2

| Environment | PO2 (mmHg) | PO2 (% in microenvironment) |
|---|---|---|
| Air (reference) | 160 mmHg | 21.1% |
| Blood, arterial | 100 mmHg | 13.2% |
| Blood, venous | 40 mmHg | 5.3% |
| Bone marrow | 49 mmHg | 6.4% |
| Brain | 34 mmHg | 4.4% |
| Cell | 9.9-19 mmHg | 1.3-2.5% |
| Liver | 40 mmHg | 5.4% |
| Lung | 42.8 mmHg | 5.6% |
| Kidney | Humans: 72 mmHg cortex Animal studies: 10-20 mmHg medulla 50 mmHg cortex | 9.5% (for human cortex) |
| Mitochondria | <9.9 mmHg | <1.3% |
| Muscle | 29 mmHg | 3.8% |
| Skin (dermal papillae) | 24 mmHg | 3.2% |
| Skin (superficial) | 8 mmHg | 1.1% |

From the data herein, it can be seen that H2 is 60% as soluble in water as O2, while acetylene is almost 31 times as soluble in water as O2, and several other gasses are also much more soluble in water than O2. However, in blood and other tissue, both heme (which locally increases O2 concentration) and metabolism (which locally decreases O2 concentration) affect the concentrations of O2, which range from a high of 13.2% in arterial blood, to a low of 1.1% in superficial skin.

Since, for the current example, the assumption is that O2 is going to be used to oxidize the fuel, the broad range of O2 levels in different tissues, coupled with the amount of fuel enrichment of the atmosphere, the pressure of the atmosphere, the solubility of the fuel in water/blood, and other factors, will affect how much power can be generated by a fuel cell. In some situations, a fuel cell will be fuel-limited, while in others, it will be oxygen-limited. Different fuels also release different amounts of energy when oxidized.

Levels of H2 Required to Fully Utilize O2

To provide basic exemplary calculations to determine when a fuel cell is fuel-limited, and when it is oxygen-limited, and how much power it can generate under various scenarios, H2 is used as an exemplary fuel. Similar calculations for other fuels should be apparent to one skilled in the art.

The reaction to oxidize H2 is:

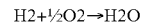

$$H2 + \tfrac{1}{2} O2 \rightarrow H2O \quad \text{Eq. 5}$$

Thus, twice as many moles of hydrogen are needed than of oxygen.

The O2 levels of venous blood (5.3%, or 530 um) seem reasonably representative of a mammalian body as a whole. They are substantially lower than arterial blood and at least parts of the kidney, but higher than muscle and skin, and about the same as brain, liver and lung. In designing fuel cells for powering devices operating in medical situations, one must decide whether to design for operation in high, average, or the limiting O2 levels such as those found in superficial skin (1.1%) and intracellular environments (1.3-2.5%). If operation is to be confined to a particular environment inside an organism, the O2 level in that environment can be used, but for a more general-purpose fuel cell, performance should be considered for utility in a variety of different O2 levels.

As noted herein, venous blood has PO2=40 mmHg=5.3%=530 uM=5.3E-4 M. Since 5.3% O2=5.3E-4M, one can use a conversion factor:

O2%=O2M*10000    Eq. 6

Or, rearranging:

O2M=O2%/10000

And, given that per H2's Henry constant, water in contact with 100% H2 would, at equilibrium, result in a concentration of 7.8E-4 M, one can determine the percentage of H2 (ignoring any gradient that may be created by oxidizing the H2) that a subject would have to inhale to be able to fully oxidize a given percentage of O2 using the formula:

H2%=(2M O2/1M H2)*100*((O2%)/10000)/7.8E-4M    Eq. 7

A table of values based on the above formula follows. Note that the ranges are only exemplary and could certainly be lower or higher than listed in the table. Note that H2 percentages over ~79% are impossible to achieve at 1 atm if ~21% O2 must be present to maintain normal physiological function (this is not always the case, and clearly not the case in non-biological settings). Numbers over 100% would require higher pressures to achieve, and all numbers are written with respect to 1 atm. So, for example, an atmosphere of pure H2 at 2 atm would be considered 200% H2.

TABLE 3

| O2 % in tissue | [O2](uM) | Inhalation H2% to oxidize O2 @ 1 atm |
|---|---|---|
| 1 | 100 | 25.6 |
| 2 | 200 | 51.3 |
| 3 | 300 | 76.9 |
| 4 | 400 | 102.6 |
| 5 | 500 | 128.2 |
| 6 | 600 | 153.8 |
| 7 | 700 | 179.5 |
| 8 | 800 | 205.1 |
| 9 | 900 | 230.8 |
| 10 | 1,000 | 256.4 |

Since 79% hydrogen is the most the atmosphere can be enriched at 1 atm and still leave room for 21% O2, at this O2 level the highest H2 levels attainable under normal pressure would be enough to oxidize just over 3% O2. So, breathing a mixture of 21% O2 and 79% H2 would allow devices to be O2 limited in some tissues, but most tissues have an O2 content of about 3.8-5.6%, and so at 1 atm, a fuel cell would be H2 limited.

Using a hyperbaric chamber (in which is included any apparatus that serves to increase pressure over that of the local ambient pressure) to contain the reactant-enriched atmosphere (such as the chamber 206 shown in FIG. 2 or the chamber 406 shown in FIG. 8), the subject can be exposed to an elevated gas pressure; for example, at a pressure of 2 atm, the subject could breathe 10.5% O2 (21% @ 1 atm/2 atm) to obtain sufficient oxygen for respiration or other metabolic processes, while leaving 89.5% free for H2, and since this is at 2 atm, that is equivalent to 179% H2 @ 1 atm. So, referring to Table 3, at 2 atm, enough H2 can be dissolved to be O2-limited in any tissue that has <=~7% O2 (which is almost all tissues except arterial blood, which would require about 3.5 atm for the atmosphere to contain enough H2 so that the 13% O2 found in arterial blood could be fully utilized. Typical hyperbaric chambers permit pressures up to 6 atm, but any safe pressure could be used. Also, note that ambient pressure may not be ~1 atm in all situations. For example, at altitudes above sea level, pressure decreases. At sea level, the pressure is 760 mmHg. At 5,000 feet above sea level it is 632 mmHg, and there are mountains tops where it is as little as 226 mmHg Additionally, use in space should be considered, where the pressure is essentially 0 mmHg and so a chamber would be needed to sustain any pressure over the ambient pressure of ~0 mmHg. Also, there could be reasons to purposefully decrease pressure. For example, where it could help reduce the risk of fire/explosion, or where the ambient pressure is higher than desired (e.g., underwater). Given this, many different pressures might be used, whether <0.5 atm, 0.5-1 atm, 1 atm-2 atm, 2-3 atm, 3-4 atm, or >4 atm. ("Hyperbaric medicine," Wikipedia, The Free Encyclopedia, 2019) It should be noted that, for a small number of devices having a very small power consumption, even small amounts of hydrogen enrichment may be sufficient to power the device(s). The normal hydrogen content of air on Earth is very small (reported figures range from 0.5 to 2 ppm), so even a concentration as low as 0.1% represents a significant increase over normal air.

Note that using all the O2 in a tissue to power fuel cells would initially seem to be ill-advised, since it would result in there being no O2 left for the tissue's metabolism. However, a device using O2 to generate power from H2 is little different than, e.g., muscles using O2 to generate ATP and other metabolic products during exercise. The body would compensate, increasing heart rate and the rate of respiration, to provide additional oxygen. An average human can easily double their resting metabolism with only modest activity. Vigorous exercise can increase the metabolic use of O2 by about 4× to 18×, and even higher for very brief periods of time (e.g., sprinting).

Doubling O2 consumption is analogous to the situation where one or more fuel cells uses all the O2 that would normally be present at rest, and so the body must import twice as much oxygen to support both the fuel cells and baseline metabolism. Obviously, this level of activity could likely be maintained by a healthy person essentially indefinitely.

Fuel Cell Energy Output

The literature is sometimes unclear, when referring to kJ/mol, as to "Moles of what—fuel or oxidizer?" Since many fuel cells, including a hydrogen fuel cell, do not use a 1:1 fuel:oxidizer ratio, this is an important distinction and careful attention has to be paid to the reaction coefficients.

For a hydrogen fuel cell, the reaction is:

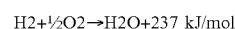

(Nave, "Electrolysis of Water and Fuel Cell Operation," Atlanta, Ga., US, Department of Physics & Astronomy, Georgia State university, 2001) Note that the energy is sometimes listed as 286 kJ/mol, but this is only for enthalpy, without accounting for entropy.

For comparison purposes, a glucose fuel cell (which we use for exemplary purposes since it is another type of fuel cell considered for medical applications), when catalyzed by glucose oxidase, the reaction is:

$$C_6H_{12}O_6 + \tfrac{1}{2}O_2 \rightarrow C_6H_{10}O_6 + H_2O + 100 \text{ kJ/mol}$$

(Rubin and Mor, "Physical Modeling of the Enzymatic Glucose-Fuelled Fuel Cells," Advances in Chemical Engineering and Science, 04, 2013).

Given the reaction energies above, oxidation of H2 yields about 237 kJ/mol/100 kJ/mol~=2.37 times as much energy as glucose oxidase catalyzed oxidation of glucose, using the same amount of oxygen. Another way to view this is that a hydrogen fuel cell can provide the same amount of power as a glucose fuel cell using only 42% as much oxygen.

This means that, assuming both types of fuel cells are oxygen-limited, an H2 fuel cell operating in 3% O2 can produce as much power as a glucose fuel cell operating in 7% O2. Other than arterial blood and part of the kidney (the cortex), all tissues that have been reviewed have an O2 content <7%, indicating that except in these two tissues, a hydrogen fuel cell would provide more power than a glucose fuel cell. And, even in those tissues, a hydrogen fuel cell provides either more power, or uses less oxygen, or a combination somewhere in between.

A simple glucose fuel cell only performs the first step of glucose oxidation. Many organisms, humans included, oxidize glucose more completely and efficiently. Humans, for example, generate about 20 kJ/liter O2 consumed, or 448 kJ/mol. By comparison, a hydrogen fuel cell using 1 mole of O2 (requiring 2 moles H2), would product 474 kJ/mol. However, fuel cells are not 100% efficient. Assuming an efficiency of 90%, a hydrogen fuel cell produces about 95% as much power as the human body would from the same amount of O2.

The human body uses about 100 watts of power at rest, while consuming about 0.3 liters O2/min. Vigorous physical activity can use many times that amount of energy. For example, professional bicycle racers may consume over 1800 watts, while consuming over 5 liters O2/min (Urone, Hinrichs et al., "Work, Energy, and Power in Humans," OpenStax, 2019)

If the human body uses about 100 watts at rest, and hydrogen fuel cells produce about 95% as much power from the same amount of O2, that leads to the conclusion that fuel cells could produce about 95 watts of power while consuming the same amount of oxygen that a human consumes at rest. Of course, in the case where the fuel cells are operating inside the human body, the human would then need to double their oxygen intake to account for both their basal metabolism and the O2 consumed by the fuel cells. This is a very modest increase in metabolism. Trained athletes can use up to about 18 times their basal oxygen consumption for extended periods of time. Most fit people could at least triple their basal oxygen consumption for extended periods of time. So, 95 watts actually represents a lower threshold of O2 that could be made available to fuel cells within the body. A fit, healthy person could likely sustain a 95 watt fuel cell load for extended, or even indefinite, periods of time, and much more than that for shorter periods of time.

Obviously, the same type of calculations can be applied to acetylene, ethylene, cyclopropane, and all the other exemplary fuel gasses discussed herein, and all those that would be obvious based on appropriate parameters for energy released when oxidized, safety, toxicity, solubility, and to a lesser extent (since in a medical scenario a circulatory system actively brings the blood to within very small distances of most, if not all, tissues), diffusion rate.

Note that vastly differing concentrations or amounts of fuel and oxidizer may be appropriate for different scenarios. Due to this, sufficiency or insufficiency of reactant levels is not readily expressed in concentrations or amounts. For example, herein we show that, to a first approximation, in a medical context about 95 Watts (or more) could be provided to devices via hydrogen fuel cells. That amount of power might be needed by a large device, for example, VADs, or "ventricular assist devices" can consume dozens of Watts. Alternatively, substantial power may be required because multiple smaller devices are being powered. On the other hand, there are also devices, such as biosensors, that only consume microwatts. (Bocan and Sejdic, "Adaptive Subcutaneous Power Transfer to Implantable Devices: A State of the Art Review," Sensors, 2016). Other wireless devices, either due to simply lower power consumption, or only operating in burst mode (which is to say, the device is off or in sleep mode for substantial periods of time, and then turns on, performs its duties, and turns back off again), might only consume nanowatts. (Oshima, Matsunaga et al., "Ultralowpower Sensor Node with Nanowatt Wireless Circuit Technology," NIT Technical Review, 1, 2015). So, the range of power consumption between devices can range over greater than 10 orders of magnitude. This means that, while for example, an enriched atmosphere of 21% O2 and 79% H2 (or higher, by increasing pressure) might be needed for some devices, other devices could operate with 10% H2, 5% H2, 4% H2 (at about the point the danger of flammability goes away), 3% H2, 1% H2, 0.1% H2, or even less (which is still substantially enriched compared to the amount of H2 in normal air, which is about $5 \times 10^{-5}$%, 0.00005%. Given this, "sufficient" or "insufficient" amounts of reactants must be relative to specific device power requirements and operating modes, and so by "sufficient" what is meant is "enough to carry out the intended functions which are fuel-cell powered."

Non-Medical Applications

Medical uses are just one of the ways in which the methods and systems as described herein could be applied. The use of devices adapted to extract fuel and oxidizer directly from their environment, while enriching that environment with fuel and/or oxidizer as needed, could be applied to many very different applications. For example, consider environmental remediation. If devices that, e.g., destroyed or collected some undesirable elements or compounds in the environment needed a way to gather power that would let them operate longer, or allow the devices to be simplified or have greater space available for other functions, this could be done.

Hydrogen, for example, is non-toxic, any that escaped would dissipate harmlessly. The only concern would be fire/explosion, but in some situations, even that is unlikely to be an issue. For example, if the target of the environmental remediation was a body of water, hydrogen could be added to the water. Assuming that the water contained living organisms (e.g., fish in a lake), oxygen might be provided as well, to replace any oxygen used by the fuel cells. Aeration of the water with oxygen and hydrogen, done properly, would not create a risk of fire or explosion because such reactions cannot propagate in water. While some H2 and O2 would escape from the top of the body of water via diffusion, H2, being much lighter than air, will quickly and harmlessly diffuse away. As long as the aeration of the water with H2 is kept to a rate that does not allow a flammable/explosion concentration to accumulate at the water's surface, the risk of fire/explosion is essentially eliminated. While other gasses, generally having lower diffusion constants than H2, and being heavier than H2, could pose a greater concern in terms of developing a concentrated layer at the water's surface, these factors can be taken into account and other gasses use safely by many methods, such as reducing the rate of aerating the fuel into the water, using fans to disperse the gasses, or by placing a temporary cover over either the entire body of water if desired and feasible, or portions of the body of water above where the aeration is taking place. Such a cover would have the effect of trapping the gasses in the water, where they cannot be a flame or explosion hazard. Additionally, if there was concern that the fuel itself was bad for the environment, that the cost of the gasses make it desirable to use them more efficiently, or other reason exists to avoid simply letting the gas dissipate, a cover employed to contain the gas could be beneficial.

Additionally, a liquid environment need not be present, although this does mean that if the fuel and oxidizer are going to be present in flammable/explosive concentrations, proper precautions should be taken. For example, consider the utility of robots, sensors, or other devices with an essentially limitless supply of reactants (via enriching the environment) that could be used for anything from manufacturing to monitoring or sensing of many types, or many other uses. In some cases, the fire hazard would mean that controlled conditions (e.g., spark prevention, perhaps via grounding, or mixing water vapor into the gas) would be recommended. None the less, the ability to refuel any number of devices just by, e.g., pumping some hydrogen into the space in which the devices were operating, could be attractive as compared to changing batteries, running power lines, or say, relying upon solar power (which may not provide enough energy and is not present at night or in dark, enclosed conditions).

Fuel Safety

As noted elsewhere herein, a hydrogen concentration >4% or an acetylene concentration >2.5% in air can explode. Many other fuels have similar safety issues. However, such issues can be addressed. For example, non-sparking lab equipment is available for use in flammable atmospheres, and gas levels can be monitored and regulated (where it is feasible to stay out of the flammable range, which it may not be). Also, in some cases, such as application of the enriched-environment with a breathing mask, the fuel is going from the mask, into the lungs, and then into an aqueous environment (where it would no longer be flammable). This greatly reduces the chance for dangerous sparks, as opposed to, for example, filling a hyperbaric chamber with a fuel/oxygen mix. In fact, a hyperbaric chamber can be used without having any fuel in the general air. The chamber only needs to supply the pressure. The fuel, along with the necessary oxygen, can still be supplied via a breathing mask, at the pressure of the hyperbaric chamber. This would be similar to underwater divers breathing gas mixes at greater than 1 atm; they aren't breathing the water, yet the water is supplying the pressure that causes the inhaled gas to be above 1 atm. In fact, the bottom of a pool could, in theory, serve as a hyperbaric chamber (which would certainly reduce the chance of fire).

Regarding potential health risks due to toxic effects of hydrogen on the subject, available data does not indicate any toxic effects, even at relatively high concentrations. Available data are limited, since many medical studies with H2 are performed using only 2-4% H2, presumably to avoid the explosion risk noted above. For H2 concentrations less than 4%, there are numerous studies on inhaled H2 in both animals and humans. (Ge, Yang et al., "Molecular hydrogen: a preventative and therapeutic medical gas for various diseases," Oncotarget, 60, 2017).

The data available pertaining to inhaled H2 concentrations >4% generally comes from deep diving or space research, using gas mixtures where the O2 level is kept low, again to reduce explosion risk. Special gas mixes for diving include Hydreliox (49% H, 50.2% He, and 0.8% O), and Hydrox (96% H, 4% O). Very low concentrations of O2 can be used in deep diving because high pressures are employed, and the pressure is such that the total amount of O2 available for biological processes is still sufficient, even though the concentration in the mixture is low enough to minimize the risk of explosion.

It should be noted that, given the increased pressure in deep diving, the total amount of hydrogen being inhaled when such mixtures are employed can be over 30× that of breathing 79% hydrogen at 1 atm. Various tests, and deep dives, have been done at 30-50+ atm, some for days, or even weeks at a time. (Gerard, Comet et al., "LONG TERM HYDROGEN SATURATION DIVE_HYDRA IX," Undersea and Hyperbaric Medical Society, Inc. Joint Annual Scientific Meeting with the International Congress for Hyperbaric Medicine and the European Undersea Biomedical Society, Amsterdam, N L, 1990) In these tests, no apparent toxic effect of breathing very high amounts of hydrogen were found. Other than its apparent ability to quench free radicals (for which it has been studies as a therapeutic agent), H2 seems to be biologically inert.

In a medical context, if a hyperbaric chamber is used to facilitate creating an enriched atmosphere for an organism at above atmospheric pressure, decompression should be considered. Decompression is a well-known factor in diving. When diving, water pressure increases about 1 atm for every 10 meters of depth, and thus a 2 atm pressure to obtain 179% H2 (compared to 1 atm levels) is equivalent to being about 30 feet underwater. A dive of several hours at a depth of 30 feet is just on the edge of what would be considered a no-decompression dive. Most decompression tables include 30 feet, while some start at 40 feet. For treatments requiring more than about 3-5 hours of time at 2 atm, some decompression may be prudent to err on the side of safety. Higher pressure over several hours or longer would clearly require decompression. Of course, this assumes that the organism in question is susceptible to the problems caused by decompression. If the context were, e.g., cells in a culture dish, decompression may not be an issue.

While each gas will have its own set of safety criteria, include medically-safe percentages, fire-safety precautions, and decompression considerations, the explanation of the issues surrounding hydrogen should provide enough guidance to make it clear how to choose other appropriate gasses and use them in a safe manner.

One interesting capability that results from powering devices by use of an enriched atmosphere is that it allows devices to be deactivated by eliminating the fuel in the atmosphere (e.g., such as by replacing it with nitrogen, as in normal air). Without fuel from the atmosphere, the devices would consume all the fuel available in the local environment and then become inactive due to lack of power. This provides a safety factor allowing deactivation of the devices, even in the event of a failure of control.

Although the present invention is described with reference to particular examples, other methods, systems, fuel cells, and devices are possible for obtaining the benefit of the present invention. Accordingly, the spirit and scope of the appended claims should not be limited to the description of the particular examples contained herein.

BIBLIOGRAPHY

, (1998), "TWRI Book 9," U.S. Geological Survey.
, (2004), "Air Solubility in Water," Engineering ToolBox.
, (2014), "Types of Fuel Cells," U.S Department of Energy.
, (2019), "Hyperbaric medicine," Wikipedia, The Free Encyclopedia.
, (2019), "Microbial fuel cell," Wikipedia, The Free Encyclopedia.
Babas-Dornea, E. and Noirhomme, B., (2002), U.S. Pat. No. 6,436,257, "Means for Detecting and Measuring the Concentration of Acetylene Dissolved in a Fluid".
Belanger, G. and Missout, G., (1981), U.S. Pat. No. 4,293,399, "Device for Detecting and Measuring the Concentration of Gaseous Hydrogen Dissolved in a Fluid".
Bocan, K. N. and Sejdic, E. (2016), "Adaptive Subcutaneous Power Transfer to Implantable Devices: A State of the Art Review", Sensors.
Carreau, A., El Hafny-Rahbi, B., et al. (2011), "Why is the partial oxygen pressure of human tissues a crucial parameter? Small molecules and hypoxia", J Cell Mol Med.
Cearnaigh, D. C. U., Dumont, j. H., et al., (2015), "High-Performance Direct Dimethyl Ether Fuel Cell Operating with an Advanced Activation Process," Phoenix, Ariz., US.
Dossas, V. and Kraft, C. H., (2005), U.S. Pat. No. 6,896,222, "Hydrogen Lighter-Than-Air Ship".
Freitas, R., (1999), "Nanomedicine, Volume I: Basic Capabilities," Landes Bioscience.
Ge, L., Yang, M., et al. (2017), "Molecular hydrogen: a preventative and therapeutic medical gas for various diseases", Oncotarget.
Gerard, B., Comet, M., et al., (1990), "LONG TERM HYDROGEN SATURATION DIVE_HYDRA IX," Amsterdam, NL.
Grincourt, Y. and Babes-Dornea, E., (2011), U.S. Pat. No. 8,002,957, "Sensor Apparatus for Measuring and Detecting Acetylene and Hydrogen Dissolved in Fluids".
Ho, J., (2014), "Glucose Fuel Cells," Stanford university.
Hu, S., Lozada-Hidalgo, M., et al. (2014), "Proton transport through one-atom-thick crystals", Nature.
James H. Dougherty, J., (1974), "The Use of Hydrogen as an Inert Gas During Diving: Pulmonary Function During Hydrogen-Oxygen Breathing at Pressures Equivalent to 200 Feet of Sea Water."
Lan, A., Li, K., et al. (2009), "RPM3: a multifunctional microporous MOF with recyclable framework and high H2 binding energy", Inorg Chem.
Moghaddam, S., Pengwang, E., et al. (2008), "Millimeter-Scale Fuel Cell With Onboard Fuel and Passive Control System", Journal of Microelectromechanical Systems.
Nave, C. R., (2001), "Electrolysis of Water and Fuel Cell Operation," Atlanta, Ga., US, Department of Physics & Astronomy, Georgia State university.
Oshima, S., Matsunaga, K., et al. (2015), "Ultralow-power Sensor Node with Nanowatt Wireless Circuit Technology", NIT Technical Review.
Pittman, R. N., (2011), "Oxygen Transport," San Rafael, Calif., US, Morgan & Claypool Life Sciences.
Rubin, V. Z. and Mor, L. (2013), "Physical Modeling of the Enzymatic Glucose-Fuelled Fuel Cells", Advances in Chemical Engineering and Science.
Urone, P. P., Hinrichs, R., et al., (2019), "Work, Energy, and Power in Humans," OpenStax.
Vendruscolo, F., Rossi, M. J., et al. (2012), "Determination of Oxygen Solubility in Liquid Media", ISRN Chemical Engineering.

The invention claimed is:

1. A method for powering a device, comprising the steps of:
providing the device with a fuel cell adapted to acquire both fuel and oxidizer reactants from the surrounding environment and to operate to generate electrical power for the device from such reactants;
exposing at least a portion of the environment that surrounds the fuel cell to an atmosphere that is enriched with respect to at least one of said reactants, such that the enriched atmosphere provides reactants to the environment to allow the fuel cell to power the device; and
operating the device with the fuel cell in the environment.

2. The method of claim 1 wherein the environment is inside a biological organism that actively exchanges gasses with the enriched atmosphere.

3. The method of claim 2 wherein the environment is a gaseous environment.

4. The method of claim 2 wherein the environment is a liquid environment.

5. The method of claim 1 wherein the environment is a body of liquid exposed to the enriched environment.

6. The method of claim 1 wherein the enriched atmosphere is enriched with fuel.

7. The method of claim 6 where the fuel is hydrogen.

8. The method of claim 6 wherein the fuel is acetylene.

9. The method of claim 1 wherein the pressure of the enriched atmosphere is increased above ambient pressure.

10. The method of claim 1 wherein the enriched atmosphere is enriched with oxidizer.

11. The method of claim 10 where the oxidizer is oxygen.

12. The method of claim 11 wherein the pressure of the enriched atmosphere is increased above ambient pressure.

13. The method of claim 1 wherein the enriched atmosphere is enriched with both fuel and oxidizer.

14. The method of claim 1 further comprising the steps of:
providing the device with at least one reactant storage tank that can be connected to the fuel cell;
storing a reactant in the storage tank when excess reactant is available; and
operating the fuel cell on reactant from the storage tank when concentration in the environment is insufficient.

15. The method of claim 1 further comprising the steps of:
providing the device with at least one energy converter that can convert electrical energy generated by the fuel cell to potential energy and can convert stored potential energy into electrical energy that can power the device;
operating the energy storage device(s) to store potential energy when excess reactants are available to the fuel cell; and
operating the device using stored potential energy converted to electrical energy by the energy converter(s) when concentration of reactants in the environment is insufficient.

16. A system for powering a device operating within an environment, the system comprising:
a fuel cell adapted to accept fuel and oxidizer reactants from the environment surrounding the device and to generate electrical power for the device from such reactants; and
an atmosphere-constraining structure for controlling interaction of a reactant-enriched atmosphere with the environment so as to provide a sufficient concentration of fuel and oxidizer to the confined environment to operate said fuel cell to power the device.

17. The system of claim 16 wherein the environment is inside a biological organism that actively exchanges gasses with its surroundings, and said atmosphere-constraining structure is configured to supply the enriched atmosphere to the biological organism.

18. The system of claim 17 wherein the environment is a gaseous environment.

19. The system of claim 17 wherein the environment is a liquid environment.

20. The system of claim 16 wherein said atmosphere-constraining structure is a hyperbaric chamber that maintains the reactant-enriched atmosphere at a pressure above the ambient pressure.

21. The system of claim 16 wherein the environment is a body of liquid exposed to the enriched environment.

22. The system of claim 16 wherein the enriched atmosphere is enriched with hydrogen.

23. The system of claim 16 wherein the enriched atmosphere is enriched with acetylene.

24. The system of claim 16 wherein said fuel cell further comprises:
   a reaction cell having an anode and a cathode and configured to generate electrical energy by reacting fuel gas received at said anode with oxidizer gas received at said cathode;
   a fuel-extracting element exposed to the environment and configured to extract fuel gas therefrom so as to be available to said anode; and
   an oxidizer-extracting member exposed to the environment and configured to extract oxidizing gas therefrom so as to be available to said cathode.

25. The system of claim 24 wherein said fuel-extracting element and said oxidizer-extracting element are provided by selectively-permeable membranes.

26. The system of claim 24 wherein said fuel-extracting element and said oxidizer-extracting element are provided by sorting rotors.

27. The system of claim 16 further comprising:
   at least one reactant storage tank in the device and connectable to the fuel cell to provide a reactant thereto when concentration in the environment is insufficient for operation of the device.

28. The system of claim 16 further comprising:
   at least one energy converter that acts to convert electrical energy generated by said fuel cell to potential energy when excess reactants are available to said fuel cell and acts to convert stored potential energy into electrical energy to power the device when concentration of reactants in the environment is insufficient.

* * * * *